(12) United States Patent
Tanaka et al.

(10) Patent No.: US 11,989,079 B2
(45) Date of Patent: May 21, 2024

(54) SYSTEM MANAGEMENT DEVICE AND SYSTEM MANAGEMENT METHOD

(71) Applicant: Hitachi, Ltd., Tokyo (JP)

(72) Inventors: Aiko Tanaka, Tokyo (JP); Kazuki Ootsubo, Tokyo (JP); Yasuaki Saito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 85 days.

(21) Appl. No.: 17/902,051

(22) Filed: Sep. 2, 2022

(65) Prior Publication Data
US 2023/0139817 A1    May 4, 2023

(30) Foreign Application Priority Data
Oct. 29, 2021    (JP) .................. 2021-177721

(51) Int. Cl.
| | |
|---|---|
| G06F 11/00 | (2006.01) |
| G06F 9/48 | (2006.01) |
| G06F 9/50 | (2006.01) |
| G06F 11/07 | (2006.01) |
| G06F 11/20 | (2006.01) |
| G06F 11/34 | (2006.01) |

(52) U.S. Cl.
CPC ........ *G06F 11/0715* (2013.01); *G06F 9/4887* (2013.01); *G06F 9/5038* (2013.01); *G06F 11/0793* (2013.01); *G06F 11/2025* (2013.01); *G06F 11/3419* (2013.01); *G06F 2209/508* (2013.01)

(58) Field of Classification Search
CPC .. G06F 9/4887; G06F 9/5038; G06F 11/0709; G06F 11/0715; G06F 11/0793
See application file for complete search history.

(56) References Cited

U.S. PATENT DOCUMENTS

| | | | | |
|---|---|---|---|---|
| 2014/0019613 | A1* | 1/2014 | Ishikawa | H04L 67/1004 709/224 |
| 2014/0089727 | A1* | 3/2014 | Cherkasova | G06F 11/0715 714/6.13 |
| 2018/0181455 | A1* | 6/2018 | Ishibashi | G06F 11/0751 |
| 2022/0188192 | A1* | 6/2022 | Wang | G06F 11/1438 |

FOREIGN PATENT DOCUMENTS

| | | | |
|---|---|---|---|
| CN | 111813592 | A * | 10/2020 |
| JP | 2016-139237 | A | 8/2016 |

OTHER PUBLICATIONS

Machine Translation of Chinese Patent CN-111813592-A (Year: 2020).*

* cited by examiner

*Primary Examiner* — Michael Maskulinski
(74) *Attorney, Agent, or Firm* — MATTINGLY & MALUR, PC

(57) ABSTRACT

A system management device manages a monitored system. When a performance failure occurs in the monitored system, the system management device creates a plurality of countermeasures for the performance failure. The system management device evaluates, for each of the plurality of countermeasures, the influence of the countermeasure on the execution of a job having an execution deadline associated with the countermeasure. The system management device selects the countermeasure to be executed on the monitored system from out of the plurality of countermeasures based on the evaluation results.

12 Claims, 24 Drawing Sheets

FIG.6

112a: PAST HANDLING RECORD INFORMATION

| 112a1 | 112a2 | 112a3 | 112a4 | 112a5 | 112a6 | 112a7 |
|---|---|---|---|---|---|---|
| PAST RECORD | GROUP | DEFINITION | OBJECT | EXECUTION DATE AND TIME | SCORE DATA ID | ACTION TRIGGER EVENT |
| 1 | 1 | 1 | POD a1 | 2021/7/26 02:00 | 1 | RESOURCE USAGE OF POD a1 EXCEEDS THRESHOLD (EVENT TYPE: 1111) |
| 2 | 1 | 2 | NODE 1 | 2021/7/26 02:01 | 2 | RESOURCE USAGE OF NODE 1 EXCEEDS THRESHOLD (EVENT TYPE: 1112) |
| 3 | 2 | 1 | POD a2 | 2021/8/26 03:00 | 3 | RESOURCE USAGE OF POD a2 EXCEEDS THRESHOLD (EVENT TYPE: 1111) |
| 4 | 2 | 3 | JOB C1 | 2021/8/26 03:00 | 4 | JOB A1 IS DELAYED (EVENT TYPE: 1111) |
| ... | ... | ... | ... | ... | ... | ... |

FIG.7

112b:SCORE DATA

| ID | SCORE OF EFFECT ON COUNTERMEASURE | COST SCORE | SCORE RANGE OF INFLUENCE | DEADLINE /EXECUTION TIME SCORE | JOB HOLD SCORE |
|---|---|---|---|---|---|
| 1 | 3 | 2 | 1 | 3 | 2 |
| 2 | 2 | 1 | 2 | 3 | 3 |
| ... | ... | ... | ... | ... | ... |

FIG.8

112c: COUNTERMEASURE DEFINITION INFORMATION

| DEFINITION | OBJECT/ TARGET | CONDITION | COUNTER MEASURE | CONSIDERATION |
|---|---|---|---|---|
| 1 | POD | RESOURCE USAGE OF SPECIFIC POD EXCEEDS THRESHOLD | MOVE POD TO OTHER HIGH-SPEC NODE | ·COMPLET JOB TO BE EXECUTED BY POD TO BE ON TIME<br>·SPECS OF DESTINATION NODE OF POD MEETS REQUIREMENT<br>·JOB RUNNING ON POD MUST BE ABLE TO CONTINUE PROCESSING. |
| 2 | NODE | RESOURCE USAGE OF SPECIFIC NODE EXCEEDS THRESHOLD | MOVE POD | ·RESOURCE USAGE OF DESTINATION NODE DOES NOT EXCEED THRESHOLD<br>·JOB TO BE EXECUTED BY POD IS COMPLETED ON TIME<br>·IF JOB TO BE EXECUTED BY POD HAS HIGH PRIORITY, THERE MUST BE NO HIGH PRIORITY JOB AT DESTINATION |
| 3 | JOB | SPECIFIC JOB IS DELAYED | PUT OTHER LOW-PRIORITY JOB ON HOLD | ·PRIORITY OF JOB IS EQUAL TO OR LESS THAN SET VALUE |
| ... | ... | ... | ... | ... |

Columns: 112c1, 112c2, 112c3, 112c4, 112c5

FIG.9

112d: SCORE CALCULATION INFORMATION

112f: EFFECT ON COUNTERMEASURE (112f1, 112f2, 112f3, 112f4)

| TYPE OF EFFECT | SCORE | | |
|---|---|---|---|
| | 1 | 2 | 3 |
| TARGET RESOURCE USAGE REDUCTION RATE ※CPU USAGE, ETC | 0〜30% | 30〜70% | 70〜100% |
| JOB EXECUTION TIME REDUCTION TIME | 0〜0.5h | 0.5〜1h | 1h〜 |

112g: cost (112g1, 112g2, 112g3, 112g4)

| TYPE OF COST | score | | |
|---|---|---|---|
| | 1 | 2 | 3 |
| CLOUD RESOURCE BILLING AMOUNT RATE OF INCREASE | 20%〜 | 0〜20% | 0% |
| CLOUD RESOURCE BILLING AMOUNT INCREASED AMOUNT | 100,000円〜 | 〜100,000円 | 0円 |

112h: RANGE OF INFLUENCE (112h1, 112h2, 112h3, 112h4)

| TYPE OF RANGE OF INFLUENCE | SCORE | | |
|---|---|---|---|
| | 1 | 2 | 3 |
| INFRASTRUCTURE INFLUENCE VALUE NUMBER OF PODS AFFECTED | 50〜 | 20〜50 | 0〜20 |
| JOB INFLUENCE VALUE TOTAL PRIORITY OF AFFECTED JOBS | 50〜 | 20〜50 | 0〜20 |

112i: DEADLINE / EXECUTION TIME (112i1, 112i2, 112i3, 112i4)

| TYPE DEADLINE / EXECUTION TIME | SCORE | | |
|---|---|---|---|
| | 1 | 2 | 3 |
| SCHEDULED OVERTIME FOR PRIORITY 1 JOB | 0.25〜0.5h | 0〜0.25h | 〜0h |
| SCHEDULED OVERTIME FOR PRIORITY 2 JOB | 0.5〜1h | 0〜0.5h | 〜0h |
| SCHEDULED OVERTIME FOR PRIORITY 3 JOB | 0.75〜1.5h | 0〜0.75h | 〜0h |
| SCHEDULED OVERTIME FOR PRIORITY 4 JOB | 1〜2h | 0〜1h | 〜0h |
| SCHEDULED OVERTIME FOR PRIORITY 5 JOB | 1〜2.5h | 0〜1.25h | 〜0h |

112j: JOB HOLD ※HIGHEST PRIORITY IS APPLIED WHEN THERE IS A PLURALITY OF TARGET JOBS (112j1, 112j2, 112j3, 112j4)

| TYPE OF PRIORITY | SCORE | | |
|---|---|---|---|
| | 1 | 2 | 3 |
| PRIORITY OF HOLDING JOB | 1 | 2,3 | 4,5 |
| PRIORITY OF SUBSEQUENT JOB | 1 | 2,3 | 4,5 |

FIG.10

112e: AUTOMATIC HANDLING UPPER LIMIT INFORMATION

| JOB PRIORITY | ADDITIONAL COST LIMIT | OVERDUE UPPER LIMIT |
|---|---|---|
| PRIORITY 1 JOB | +500,000円 | 0h |
| PRIORITY 2 JOB | +100,000円 | 1.0h |
| PRIORITY 3 JOB | +50,000円 | 2.0h |
| ... | ... | ... |

FIG.11

212a: JOB INFORMATION

| JOB | JOB PRIORITY | CURRENT JOB EXECUTION RECORD | | RECORD OF PAST EXECUTION TIME OF JOB (h) |
|---|---|---|---|---|
| | | PROGRESS (%) | ELAPSED TIME (h) | |
| JOB A1 | 1 | 75 | 1.5 | 1.5 |
| JOB A2 | 2 | 0 | 0 | 1.5 |
| JOB B1 | 3 | 50 | 1.5 | 2 |
| JOB B2 | 4 | 0 | 0 | 1 |
| JOB C1 | 5 | 0 | 0 | 2 |
| ⋮ | ⋮ | ⋮ | ⋮ | ⋮ |

FIG.12

312a: INFRASTRUCTURE INFORMATION

| NODE (312a1) | NODE CPU USAGE (%) (312a2) | NODE MEMORY USAGE (%) (312a3) | RESOURCE USAGE FOR EACH POD (312a4) | NODE SPECIFICATIONS (312a5) | EXECUTION STATUS OF JOB RUNNING ON POD (312a6) |
|---|---|---|---|---|---|
| 1 | 90 | 80 | →POD INFORMATION | DISKTYPE: SSD | →POD INFORMATION |
| 2 | 60 | 60 | →POD INFORMATION | DISKTYPE: SSD | →POD INFORMATION |
| 3 | 30 | 20 | →POD INFORMATION | — | →POD INFORMATION |
| ⋮ | ⋮ | ⋮ | ⋮ | ⋮ | ⋮ |

FIG.13

312b: POD INFORMATION

312b10: NODE 1 POD INFORMATION

| POD ID | CURRENT PERFORMANCE RESULTS | | PAST PERFORMANCE RESULTS | | JOB EXECUTION STATUS | ... |
|---|---|---|---|---|---|---|
| | CPU USAGE (%) | MEMORY USAGE (%) | CPU USAGE (%) | MEMORY USAGE (%) | | |
| Pod a1 | 30 | 40 | 30 | 40 | JOB A1 DELAY | ... |
| Pod b1 | 60 | 40 | 30 | 20 | JOB B1 DELAY | ... |

312b11, 312b12, 312b13, 312b14, 312b15, 312b16

312b20: NODE 2 POD INFORMATION

| POD ID | CURRENT PERFORMANCE RESULTS | | PAST PERFORMANCE RESULTS | | JOB EXECUTION STATUS | ... |
|---|---|---|---|---|---|---|
| | CPU USAGE (%) | MEMORY USAGE (%) | CPU USAGE (%) | MEMORY USAGE (%) | | |
| Pod a2 | 40 | 45 | 40 | 45 | JOB A2 NORMAL | ... |
| Pod b2 | 20 | 15 | 20 | 15 | JOB B2 NORMAL | ... |

180: COUNTERMEASURE

| COUNTERMEASURE (181) | SINGLE (182) | COMBINATION (183) | CONTENTS (184) | HOLDING SPECIFIC JOB (185) | ADDING NODE (186) |
|---|---|---|---|---|---|
| (1) | ◯ | × | •MOVE POD A TO WORKER NODE 3 WHERE NO JOB IS RUNNING | × | × |
| (2) | ◯ | × | •MOVE POD a TO WORKER NODE 2 WHERE JOB A2 IS RUNNING. | × | × |
| (3) | ◯ | × | •JOB A1 ON WORKER NODE 1 IS PUT ON HOLD | ◯ | × |
| (4) | × | ◯ | •MOVE POD A1 AT WORKER NODE 1 TO WORKER NODE 2<br>•PENDING JOB B2 | ◯ | × |
| (5) | × | ◯ | •ADD WORKER NODE<br>•MOVE POD A OF WORKER NODE 1 TO ADDED WORKER NODE | × | ◯ |
| ⋮ | ⋮ | ⋮ | ⋮ | ⋮ | ⋮ |

SYSTEM MANAGEMENT DEVICE AND SYSTEM MANAGEMENT METHOD

CROSS-REFERENCE TO RELATED APPLICATION

The present application claims priority from Japanese application JP 2021-177721, filed on Oct. 29, 2021, the contents of which is hereby incorporated by reference into this application.

BACKGROUND OF THE INVENTION

1. Field of the Invention

The present invention relates to a system management device and a system management method.

2. Description of the Related Art

When a performance failure (e.g., node failure, resource shortage) occurs in a cloud-native environment, there is a conventional technology (e.g., Japanese Patent Application Laid-Open No. 2016-139237 (referred to as "Patent Document 1")) that automatically creates a plurality of countermeasures/coping plans such as automatically scaling, and automatically executes the created countermeasures.

The cloud system of Patent Document 1 includes a business system including a plurality of business computers. When performance degradation (performance failure) of the business computers is detected, the cloud system selects a plurality of coping methods (countermeasures/coping plans) that meets the service requirements of the business system and executes the feasible coping methods (countermeasures/coping plans).

Batch jobs that have been executed in on-premises environments are now being executed in cloud-native environments. When a performance failure occurs in the cloud-native environment while executing a batch job, a countermeasure to address/deal with the performance failure must be selected and executed.

However, the conventional technology does not select the countermeasure in consideration of the influence of the countermeasure on the job. Therefore, for example, if the conventional technology automatically executes the selected countermeasure when the performance failure occurs, it may result in failure to meet the batch job termination deadline.

SUMMARY OF THE INVENTION

The present invention has been made in order to cope with the above problems. That is, an object of the present invention is to provide a system management device and a system management method that can select a countermeasure from out of a plurality of countermeasures for performance failures in consideration of the influence on a job.

In order to solve the above problem, the present disclosed system management device includes an information processing device that manages a monitored system built in a cloud environment.

The information processing device is configured to:
create, when a performance failure occurs in the monitored system, a plurality of countermeasures for the performance failure;
evaluate, for each of the plurality of countermeasures that have been created, influence of the countermeasure on execution of a job having an execution deadline associated with the countermeasure; and
select the countermeasure to be executed by the monitored system from out of the plurality of countermeasures that are evaluated to be capable of completing the job associated with the countermeasure by the execution deadline.

The present disclosed system management method is executed by a system management device that manages a monitored system built in a cloud environment.

The system management method includes:
creating, when a performance failure occurs in the monitored system, a plurality of countermeasures for the performance failure;
evaluating, for each of the plurality of countermeasures that have been created, influence of the countermeasure on execution of a job having an execution deadline associated with the countermeasure; and
selecting the countermeasure to be executed by the monitored system from out of the plurality of countermeasures that are evaluated to be capable of completing the job associated with the countermeasure by the execution deadline.

According to the present invention, the present invention can select the countermeasure from out of the plurality of countermeasures for the performance failures in consideration of the influence on the job.

BRIEF DESCRIPTION OF DRAWINGS

FIG. 6 illustrates past handling record information.

FIG. 7 illustrates score data.

FIG. 8 illustrates countermeasure definition information.

FIG. 9 illustrates score calculation information.

FIG. 10 illustrates automatic handling upper limit information.

FIG. 11 illustrates job information.

FIG. 12 illustrates infrastructure information.

FIG. 13 illustrates pod information.

FIG. 18 illustrates an example of a countermeasure.

DETAILED DESCRIPTION OF THE PREFERRED EMBODIMENT

A system management device according to an embodiment of the present invention will be described using the drawings below. In the following description, various types of information may be described using expressions such as "table" and "record," etc. However, various types of information may be expressed in data structures other than these. Furthermore, when describing identification information, expressions such as "number," "identification information," and "name" are used, but these can be replaced with each other. Furthermore, in the following explanations, a program or a functional block may be used as the subject to describe a process, but since the program is executed by a CPU to perform a defined process, the subject of the process may be replaced by the CPU instead of the program or the functional block.

<Configuration>

Figure 1:
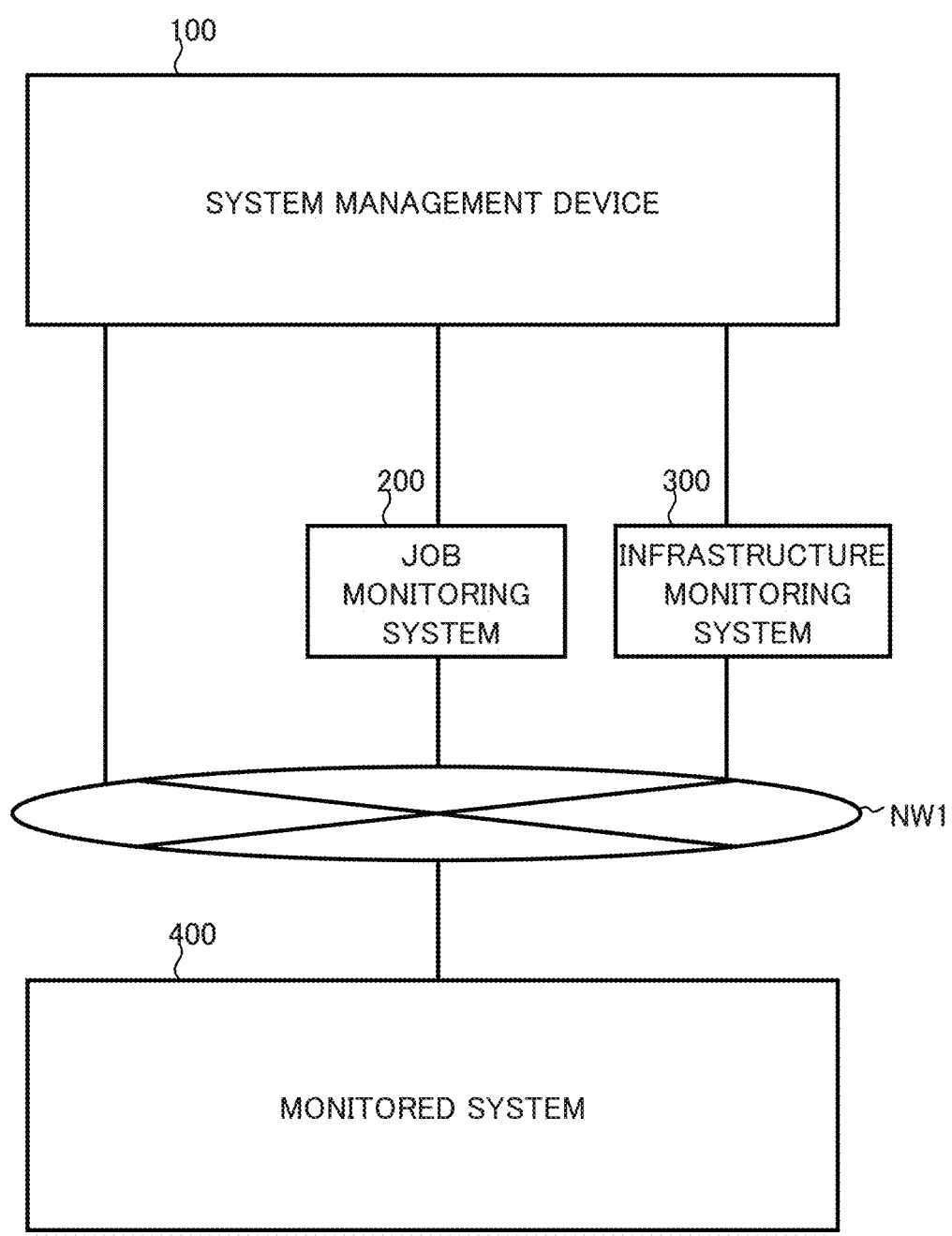
FIG. 1 is a diagram of the system including a system management device for an embodiment of the present invention.

FIG. 1 shows a diagram of the system including a system management device 100 according to an embodiment of the invention. The system includes the system management device 100, a job monitoring system 200, an infrastructure monitoring system 300, and a monitored system 400. The system management device 100, the job monitoring system 200, the infrastructure monitoring system 300, and the monitored system 400 are communicably connected to each other via a network NW1.

Figure 2:
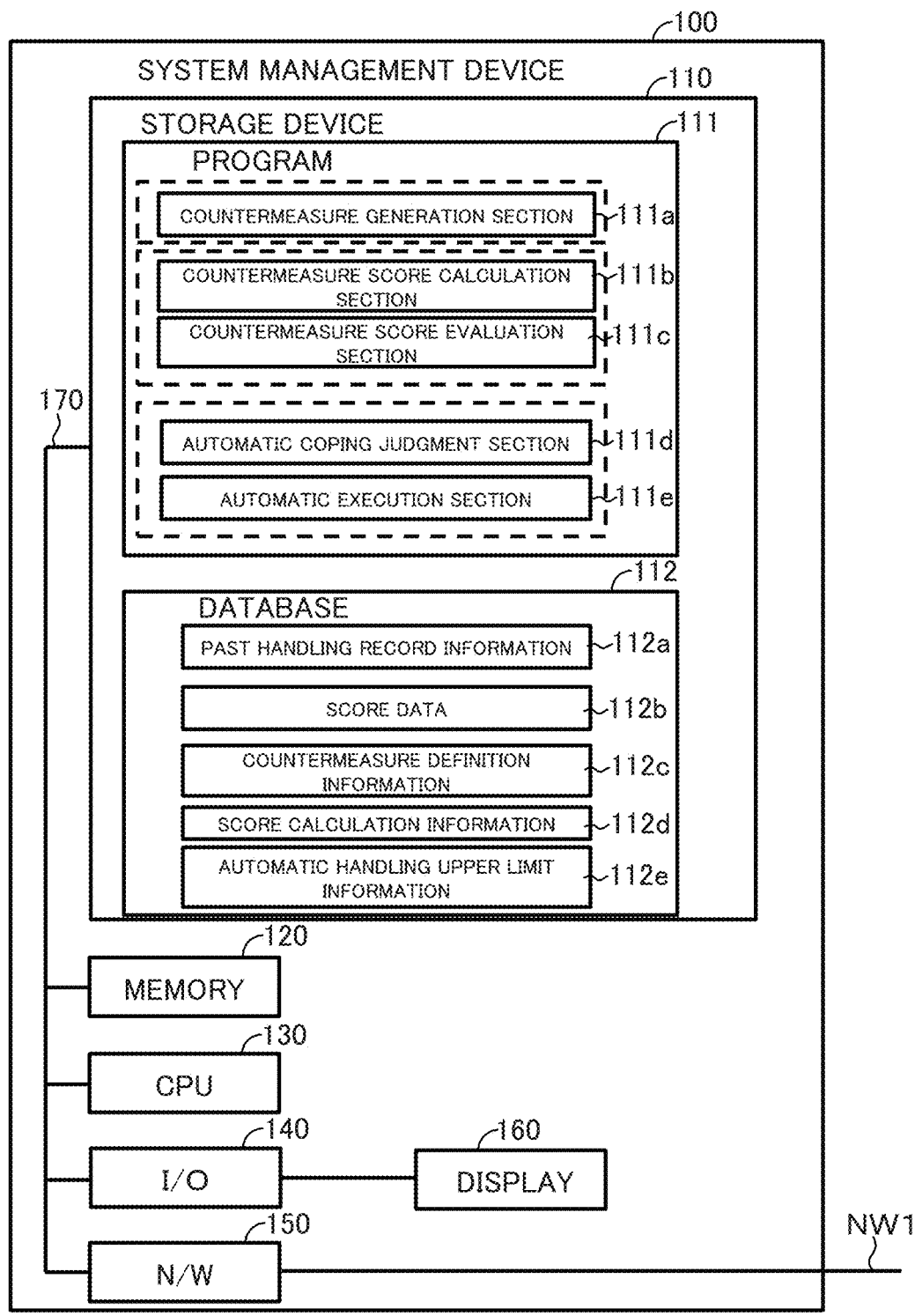
FIG. 2 shows a schematic diagram of an example configuration of the system management device.

FIG. 2 shows a schematic diagram of an example configuration of the system management device 100. As shown in FIG. 2, the system management device 100 includes a non-volatile storage device 110 that is nonvolatile and capable of reading and writing data, a memory 120 (e.g., RAM), a CPU 130, an input/output interface 140, a network interface 150, and a display 160. The device including the CPU 130, the storage device 110, the memory 120, the input/output interface 140, the network interface 150, and a bus 170 connecting them is also referred to as an "information processing device" for convenience. The information processing device may be a plurality of information processing devices or a virtual information processing device built on a cloud.

The storage device 110 holds (stores) a program 111 and a database 112.

The program 111 includes a countermeasure generation section 111a, a countermeasure score calculation section 111b, a countermeasure score evaluation section 111c, an automatic coping judgment section 111d, and an automatic execution section 111e.

The CPU 130 loads the program 111 stored in the storage device 110 into the memory 120. The CPU 130 realizes various functions of the countermeasure generation section 111a, the countermeasure score calculation section 111b, the countermeasure score evaluation section 111c, the automatic coping judgment section 111d, and the automatic execution section 111e by executing the program 111 loaded in the memory 120.

The database 112 contains past handling record information 112a, score data 112b, countermeasure definition information 112c, score calculation information 112d, and automatic handling upper limit information 112e. Note that the past handling record information 112a, the score data 112b, the countermeasure definition information 112c, the score calculation information 112d, and the automatic handling upper limit information 112e will be described in detail later.

The program 111 executed by the CPU 130 is loaded into the memory 120 as described above, and the data used by the CPU 130 is temporarily stored in the memory 120. The input/output interface 140 is an interface for connecting operating devices such as a keyboard, a mouse, and the display 160, etc. The network interface 150 is an interface used for connecting the system management device 100 to the network NW1. The display 160 need not be included in the system management device 100. The display 160 may also be referred to as the "display device" for convenience.

Figure 3:
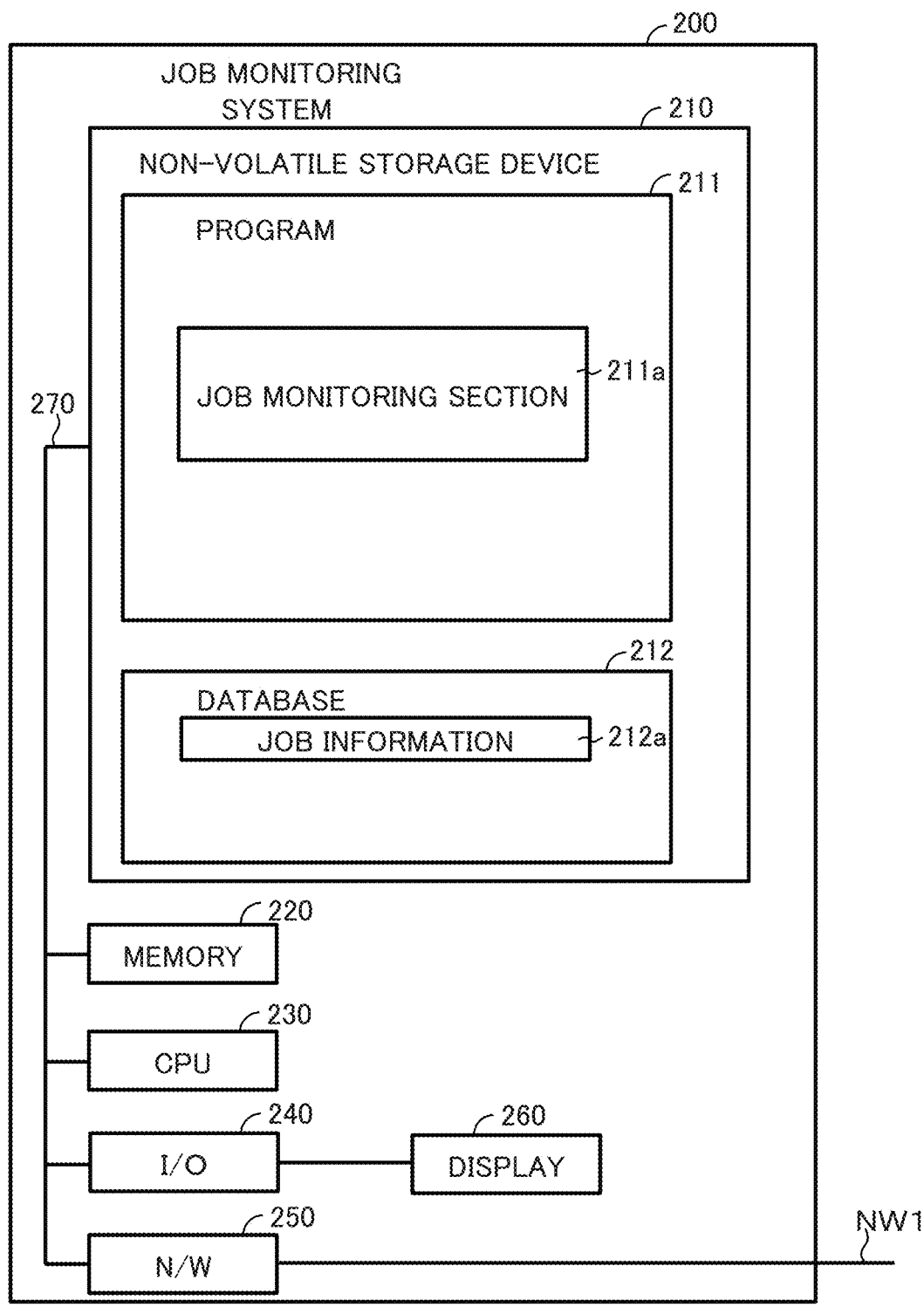
FIG. 3 shows a schematic diagram of an example configuration of a job monitoring system.

FIG. 3 shows a schematic diagram of an example configuration of the job monitoring system 200. The job monitoring system 200 includes a non-volatile storage device 210 that is nonvolatile and capable of reading and writing data, a memory 220 (e.g., RAM), a CPU 230, an input/output interface 240, a network interface 250, and a display 260.

The CPU 230 is connected to the storage device 210, the memory 220, the input/output interface 240, and the network interface 250, etc., via a bus 270.

The storage device 210 holds (stores) a program 211 and a database 212.

The program 211 includes a job monitoring section 211a. The CPU 230 loads the program 211 stored in the storage device 210 into the memory 220. The CPU 230 realizes the function of monitoring the jobs of the job monitoring section 211 by executing the program 211 loaded in the memory 220.

The database 212 includes job information 212a. It should be noted that the details of the job information 212a will be described later.

The program 211 executed by the CPU 230 is loaded into the memory 220 as described above, and the data used by the CPU 230 is temporarily stored in the memory 220. The input/output interface 240 is an interface for connecting operating devices such as a keyboard, a mouse, and the display 260, etc. The network interface 250 is an interface for connecting the job monitoring system 200 to the network NW1. The display 260 need not be included in the job monitoring system 200.

Figure 4:
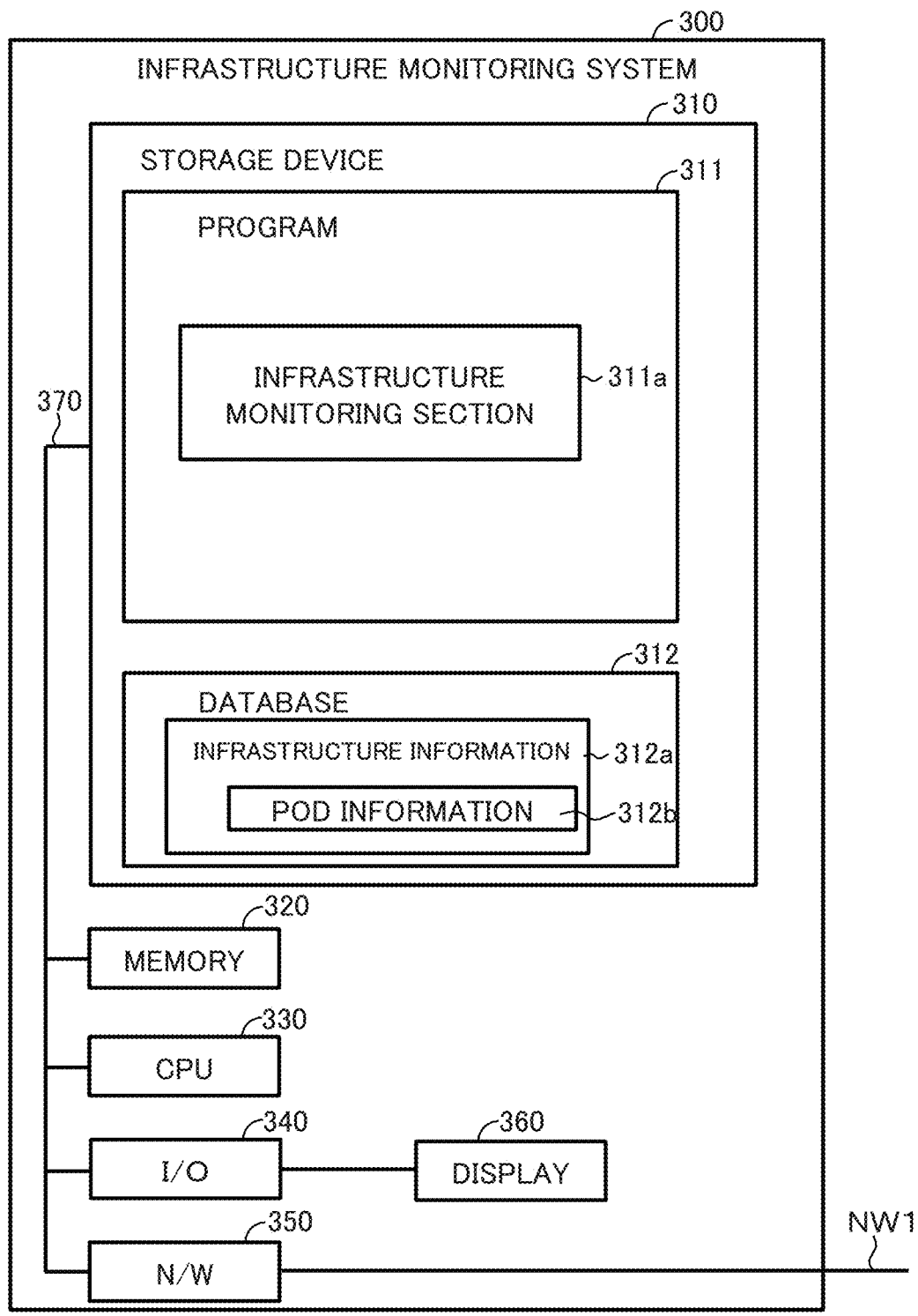
FIG. 4 shows a schematic diagram of an example configuration of infrastructure monitoring system.

FIG. 4 shows a schematic diagram of an example configuration of the infrastructure monitoring system 300. The infrastructure monitoring system 300 includes a non-volatile storage device 310 that is nonvolatile and capable of reading and writing data, a memory 320 (e.g., RAM), a CPU 330, an input/output interface 340, a network interface 350, and a display 360.

The CPU 330 is connected to the storage device 310, the memory 320, the input/output interface 340, and the network interface 350, etc., via a bus 370.

The storage device 310 holds (stores) a program 311 and a database 312.

The program 311 includes an infrastructure monitoring section 311a.

The CPU 330 loads the program 311 stored in the storage device 311 into the memory 320. The CPU 330 realizes the function of monitoring the infrastructure of the infrastructure monitoring section 311a by executing the program 311 loaded in the memory 320.

The database 312 includes infrastructure information 312a. The details of the infrastructure information 312a will be described later.

The program 311 executed by the CPU 330 is loaded into the memory 320 as described above and the data used by the CPU 330 is temporarily stored in the memory 320. The input/output interface 340 is an interface for connecting operating devices such as a keyboard, a mouse, and the display 360, etc. The network interface 350 is an interface for connecting the infrastructure monitoring system 300 to the network NW1. It should be noted that the display 360 need not be included in the infrastructure monitoring system 300.

Figure 5:
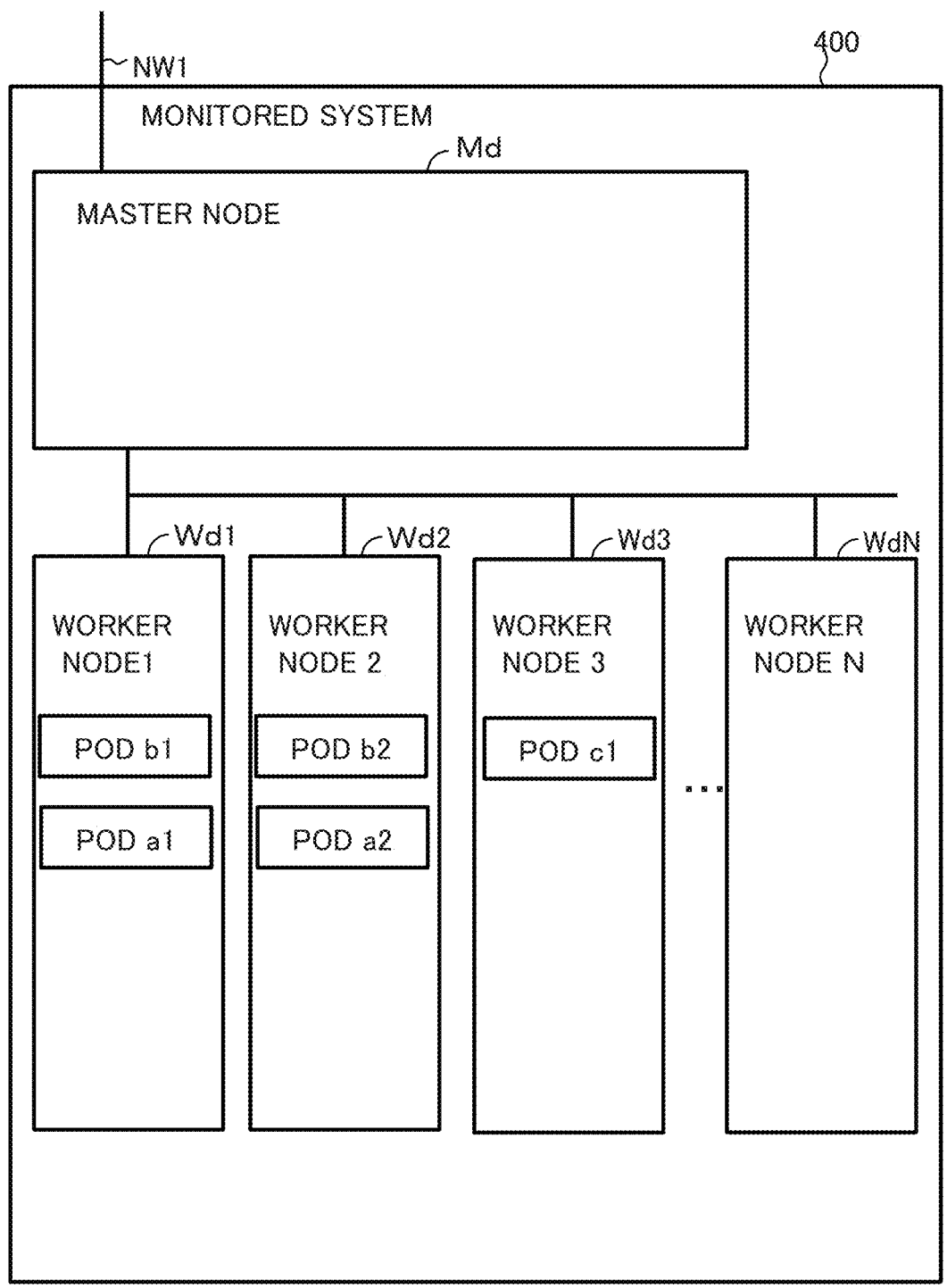
FIG. 5 shows a schematic diagram of an example configuration of a monitored system.

FIG. 5 shows a schematic diagram of an example configuration of the monitored system 400. As shown in FIG. 5, the monitored system 400 is a computer system (in this example, a Kubernetes cluster) built in a cloud (for example, a public cloud such as AWS (Amazon Web Services)). The monitored system 400 includes a master node Md and worker nodes 1 Wd1 to N WdN. This computer system is managed by a tool (in this example, Kubernetes) that performs orchestration (automating management and operation of a container).

The master node Md and the worker node 1 Wd1 to the worker node N WdN are connected to each other so as to be communicable with each other. Each of the master node Md and the worker nodes N WdN consists of one physical computer. The hardware configuration of the physical computer can be the same as that of the information processing device described above. A virtual computer may be used instead of the physical computer. In the following descriptions, each of the worker nodes 1 to N WdN is referred to simply as the "worker node Wd" when there is no need to distinguish between them. The master node Md and the worker node Wd may be referred to simply as the "node". The Kubernetes cluster is capable of scaling (updating the cluster by adding or removing nodes). In this example cloud, the amount charged (cost/fee) varies depending on the amount of resource usage and time.

The master node Md autonomously manages the worker node Wd according to the settings in the master node Md. In the Kubernetes cluster, the containers are managed on a Pod basis (a Pod-by-Pod basis).

The worker node Wd is a node for running a Pod containing one or more containers and provides an environment for container. The worker node Wd is responsible for executing launching Pod, moving Pod, deleting Pod, and scaling Pod and resource allocation changes to Pod, etc., based on instructions from the master node Md.

The system management device 100 can instruct the worker node Wd to execute the countermeasure (automatic addressing) via the master node Md. In this example of the monitored system 400, Job Net A, Job Net B, and Job Net C are executed. Job Net A is set to execute Job A1 and Job A2 in this order at a predetermined execution date and time. Job Net B is set to execute Job B1 and Job B2 in this order at a predetermined execution date and time. Job Net C is set to execute Job C1 at a predetermined execution date and time. Note that each job has an execution deadline. The monitored system 400 may also execute normal jobs (other than batch jobs) that have an end deadline (execution deadline). In this example of the monitored system 400, Pod a1 that executes Job A1 is deployed on a worker node 1 Wd1. Pod b1 that executes Job B1 is deployed on the worker node 1 Wd1. Pod a2 that executes Job A2 is deployed on the worker node 2 Wd2. Pod b2 that executes Job B2 is deployed on the worker node 2 Wd2. Pod c1 that executes Job C1 is deployed on the worker node 3 Wd3.

It should be noted that Pod(s) (not shown) for executing a business application are deployed on the worker node Wd, in FIG. 5.

The following is a detailed description of the aforementioned information stored in the database 112 of the storage device 110 of the system management device 100.

FIG. 6 illustrates the past handling record information 112a. As shown in FIG. 6, the past handling record information 112a is stored as a database in the storage device 110 of the system management device 100. The past handling record information 112a includes, as columns that store information (values), a past record 112a1, a group 112a2, a definition 112a3, an object 112a4, an execution date and time 112a5, a score data ID 112a6, and an action trigger event 112a7.

The past handling record information 112a stores/contains information corresponding to each column related to the past countermeasure record, which is the actual record of past countermeasure, as row-unit information (record) in association with each other. Specifically, the past record 112a1 contains an identification number to identify the past handling records. The group 112a2 contains an identification number that identifies a group of past countermeasure (combination of the countermeasures). The definition 112a3 contains an identification number of the definition of the past countermeasure. The object 112a4 contains the target/object to which the countermeasure of the past countermeasure record is applied. The execution date and time 112a5 contains the execution date and time of the past countermeasure. The score data ID 112a6 contains an identification ID (an identification number) of the score data of the past countermeasure (see FIG. 7 below). The action trigger event 112a7 contains a trigger event of the past countermeasure.

FIG. 7 illustrates the score data 112b. As shown in FIG. 7, the score data 112b contains, as the columns that store the information (values), an ID 112b1, a score 112b2 of effect on countermeasure, a cost score 112b3, a score range of influence 112b4, a deadline/execution time score 112b5, and a job hold score 112b6.

The score data 112b stores/contains information corresponding to each column related to the score data of the past countermeasure as row-unit information (record) in association with each other. Specifically, the ID 112b1 contains an identification ID (identification number) corresponding to the identification ID of the score data described above. The score 112b2 of effect on countermeasure contains the score evaluated for the effect on countermeasure executed in the past. The score range of influence 112b4 contains the score of influence range evaluated for the past countermeasure executed in the past. The deadline/execution time score 112b5 contains the deadline/execution time score evaluated for the past countermeasure executed in the past. The job hold score 112b6 contains the job hold score evaluated for the past countermeasure executed in the past.

FIG. 8 illustrates the countermeasure definition information 112c. As shown in FIG. 8, the countermeasure definition information 112c stores/contains, as the columns that store the information (values), a definition 112c1, an object 112c2, a condition 112c3, a countermeasure 112c4, and a consideration 112c5.

The countermeasure definition information 112c contains the information corresponding to each column related to the definition of the countermeasure as row-unit information (record) in association with each other. Specifically, the definition 112c1 contains an identification number of the countermeasure definition. The object 112c2 contains the object to which the countermeasure is applied. The condition 112c3 contains a condition to apply the countermeasure. The countermeasure 112c4 contains the contents of the countermeasure. The consideration 112c5 contains the consideration that should be considered for the countermeasure.

FIG. 9 illustrates the score calculation information 112d. As shown in FIG. 9, the score calculation information 112d includes table information such as effect on countermeasure 112f, cost 112g, range of influence 112h, deadline/execution time 112i, and job hold 112j.

The effect on countermeasure 112f contains, as the columns that store information (values), an effect type 112f1, a score (1) 112f2, a score (2) 112f3, and a score (3) 112f4. The effect on countermeasure 112f stores/contains information corresponding to each column related to the score of the effect on countermeasure as row-unit information (record) in association with each other. Specifically, the effect type 112f1 contains the name of the effect type on the countermeasure. The score (1) 112f2 contains a parameter range indicating the degree of the effect corresponding to score 1. The score (2) 112f3 contains a parameter range indicating the degree of effect corresponding to score 2. The score (3) 112f4 contains a parameter range indicating the degree of effect corresponding to score 3.

The cost 112g stores/contains, as columns that store information (values), a cost type 112g1, a score (1) 112g2, a score (2) 112g3, and a score (3) 112g4. The cost 112g stores/contains information corresponding to each column related to the score of the cost as row-unit information (record) in association with each other. Specifically, the cost type 112g1 contains the name of the cost type. The score (1) 112g2 contains a parameter range indicating the degree of increase in cost corresponding to the score 1. The score (2) 112g3 contains a parameter range indicating the degree of increase in cost corresponding to score 2. The score (3) 112g4 contains the parameter range indicating the degree of cost increase corresponding to score 3.

The range of influence 112h contains, as the columns that store the information (value), an influence range type 112h1, a score (1) 112h2, a score (2) 112h3, and a score (3) 112h4. The range of influence 112h stores/contains information corresponding to each column related to the score of the influence range of the countermeasure as row-unit information (record) in association with each other.

Specifically, the influence range type 112h1 contains the name indicating the influence range type. The score (1) 112h2 contains a parameter range indicating the degree of influence range of the countermeasure corresponding to score 1. The score (2) 112h3 contains the parameter range indicating the degree of influence range of the countermeasure corresponding to score 2. The score (3) 112h4 contains the parameter range indicating the degree of influence range of the countermeasure corresponding to score 3.

The deadline/execution time 112i contains, as columns that store information (value), a deadline/execution time type 112i1, a score (1) 112i2, a score (2) 112i3, and a score (3) 112i4. The deadline/execution time 112i contains the information corresponding to each column related to the score of the deadline/execution time of the job when the countermeasure is executed, as row-unit information (record) in association with each other.

Specifically, the deadline/execution time type 112i1 contains a name indicating the type of deadline/execution time. The score (1) 112i2 contains a time length range indicating the degree of length of time beyond the deadline corresponding to score 1. The score (2) 112i3 contains a time length range indicating the degree of length of time beyond the deadline corresponding to score 2. The score (3) 112i4 contains a time length range indicating the degree of length of time beyond the deadline corresponding to score 3.

The job hold 112j contains, as the columns that store the information (values), a priority type 112j1, a score (1) 112j2, a score (2) 112j3, and a score (3) 112j4. The job hold 112j stores/contains information corresponding to each column on the job hold score as row-unit information (record) in association with each other. Specifically, the priority type 112j1 contains a name indicating the priority type. The score (1) 112 j2 contains a numerical value indicating the priority of the job corresponding to score 1. The score (2) 112 j3 contains a numerical value indicating the priority of the job corresponding to score 2. The score (3) 112 j4 contains a numerical value indicating the priority of the job corresponding to score 3.

FIG. 10 illustrates the automatic handling upper limit information 112e. As shown in FIG. 10, the automatic handling upper limit information 112e contains, as columns that store information (values), a job priority 112e1, an additional cost upper limit 112e2, and an overdue upper limit 112e3. The automatic handling upper limit information 112e stores/contains information corresponding to each column related to information necessary to determine whether or not the job can be addressed/handled automatically as row-unit information (record) in association with each other. Specifically, the job priority 112e1 contains information indicating the priority of the job. The additional cost upper limit 112e2 contains an amount indicating the upper cost limit of the additional cost. The overdue upper limit 112e3 contains the length of time indicating the overdue upper limit.

The following is a detailed description of the above information stored in the database 212 of the storage device 210 of the job monitoring system 200.

FIG. 11 illustrates the job information 212a. As shown in FIG. 11, the job information 212a contains, as the columns that store the information (values), a job 212a1, a job priority 212a2, a progress 212a3, an elapsed time 212a4, and a record of past execution time of job 212a5. Note that the job information 212a is collected from the monitored system 400 by the job monitoring section 211a and stored as a database in the storage device 210.

The job information 212a stores/contains information corresponding to each column related to the jobs executed in the monitored system 400 as row-unit information (record) in association with each other. Specifically, the job 212a1 contains the name of the job. The job priority 212a2 contains a numerical value indicating the job's priority. The progress 212a3 contains a number (percentage) indicating the current progress of the job. The elapsed time 212a4 contains a number (percentage) indicating the current elapsed time of the job. The record of past execution time of job 212a5 contains the length of the past execution time of the job.

The following is a detailed description of the above information stored in the database 312 of the infrastructure monitoring system 300.

FIG. 12 illustrates the infrastructure information 312a. As shown in FIG. 12, the infrastructure information 312a contains, as the columns that store the information (values), a node 312a1, a CPU usage of node 312a2, a memory usage of node 312a3, a resource usage of node 312a4, a node specification 312a5, and an execution status 312a6 of the job running on Pod. Note that the infrastructure information 312a is collected from the monitored system 400 by the infrastructure monitoring section 311a and is stored as a database in the storage device 310 of the infrastructure monitoring system 300. The infrastructure information 312a and the job information 212a described above are also referred to as "monitoring information" for convenience.

The infrastructure information 312a stores/contains information corresponding to each column related to the infrastructure as row-unit information (record) in association with each other. Specifically, the node 312a1 contains an identification information of the node. The CPU usage of node 312*a*2 contains the CPU usage of the node. The memory usage 312*a*3 of the node contains the memory usage of the node. The resource usage 312*a*4 of each Pod contains (and is associated with) the pod information 312*b* shown in FIG. 13 below. The node specs 312*a*5 contains information about the node specs. The execution status of the job running on Pod 312*a*6 contains (is associated with) the pod information shown in FIG. 13 below.

FIG. 13 illustrates the pod information 312*b*. As shown in FIG. 13, the pod information 312*b* includes node 1 pod information 312*b*10 and node 2 pod information 312*b*20 as table information.

The node 1 pod information 312*b*10 contains, as the columns that store information (values), a Pod ID 312*b*11, a CPU usage 312*b*12, a memory usage 312*b*13, a CPU usage 312*b*14, a memory usage 312*b*15, and a job execution status 312*b*16. Note that the node 1 pod information 312*b*10 may also contain a column that stores the execution deadline/due date. The node 1 pod information 312*b*10 stores/contains information corresponding to each column related to Pod of the worker node 1 Wd1 (node 1) as row-unit information (record) in association with each other. Specifically, the Pod ID 312*b*11 contains the identification information of the Pod deployed on the worker node 1 Wd1. The CPU usage 312*b*12 contains the current CPU usage of the Pod. The memory usage 312*b*13 contains the current memory usage of the Pod. The CPU usage 312*b*14 contains the historical CPU usage of the Pod. The memory usage 312*b*15 contains the historical memory usage of the Pod. The job execution status 312*b*16 contains the name of the job that the Pod is executing and information indicating the execution status.

The node 2 pod information 312*b*20 contains, as the columns that store the information values), a Pod ID 312*b*21, a CPU usage 312*b*22, a memory usage 312*b*23, a CPU usage 312*b*24, a memory usage 312*b*25, and the job execution status 312*b*26.

The node 2 pod information 312*b*20 stores/contains the information corresponding to each column related to the Pod of the worker node 2 Wd2 (node 2) as row-unit information (record) in association with each other. Specifically, the Pod ID 312*b*21 contains the identification information of the Pod deployed on the worker node 2 Wd2. The CPU usage 312*b*22 contains the memory usage of the Pod. The memory usage 312*b*23 contains the current memory usage of the Pod. The CPU usage 312*b*24 contains the historical CPU usage of the Pod. The memory usage 312*b*25 contains the historical memory usage of the Pod. The job execution status 312*b*26 contains the name of the job that the Pod is executing and information indicating the execution status of the job. The node 2 pod information 312*b*20 may include a column that stores the execution deadline/due date of the job.

<Outline of the Present Invention>

Figure 14:
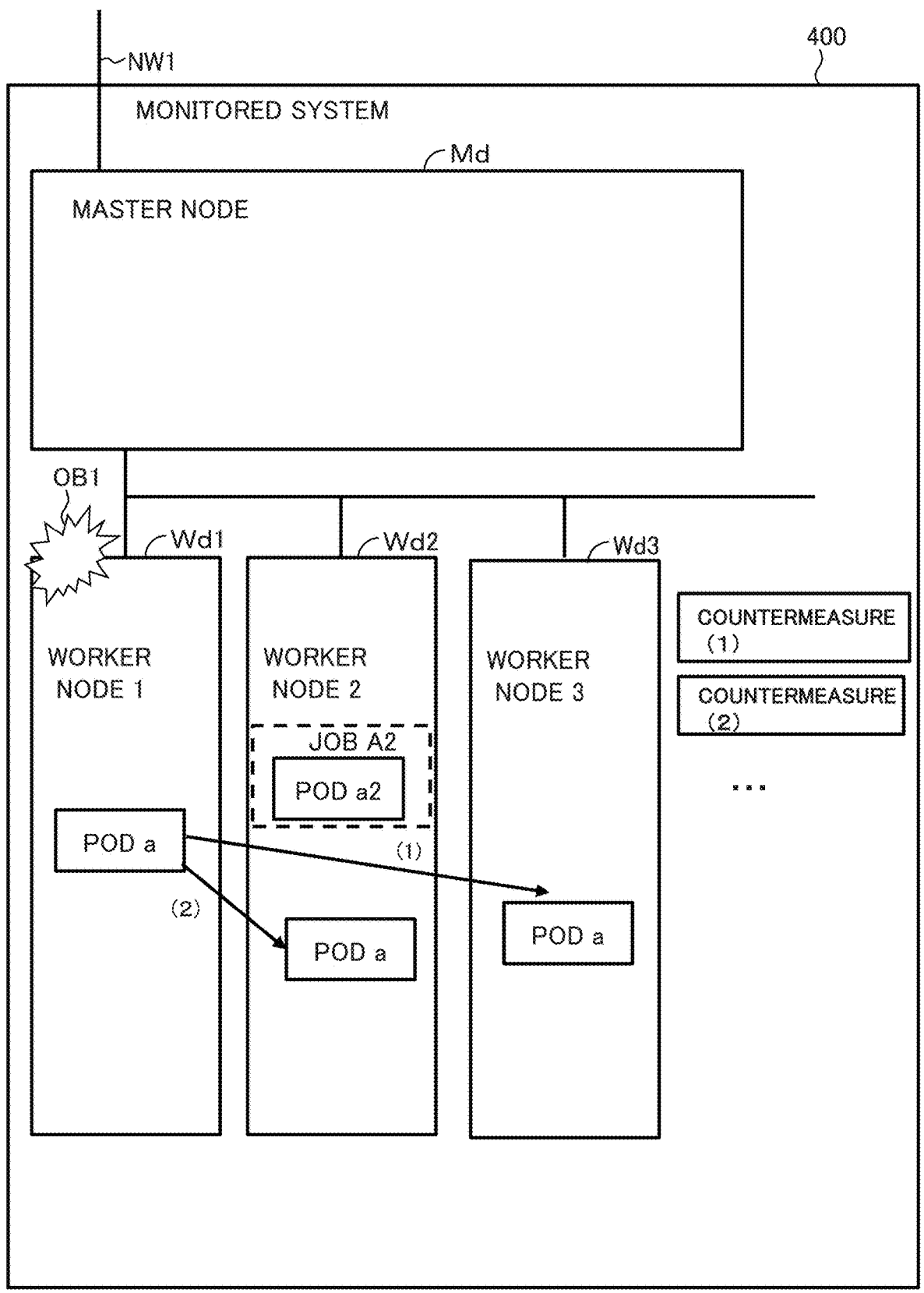
FIG. 14 illustrates an example of a countermeasure.

First, in order to facilitate the understanding of the present invention, examples of the countermeasures will be described with reference to the drawings, and then the outline of the present invention will be described. The system management device 100 detects a performance failure OB1 of the monitored system 400 based on the monitoring information (FIG. 14). The system management device 100 creates a countermeasure for the monitored system 400 to address the performance failure OB1.

In the example shown in FIG. 14, in the monitored system 400, Pod a running the business application is deployed on the worker node 1 Wd1. Pod a2 running Job A2 is deployed on the worker node 2 Wd2. Poda2 is in the process of executing Job A2.

In this case, it is assumed that the performance failure OB1 occurs in the worker node 1 Wd1. As an example of a countermeasure to be created in this case, the countermeasure (1) is a countermeasure to move Pod a to the worker node 3 Wd3, which is not executing the job. The countermeasure (2) is a countermeasure to move Pod a to the worker node 2 Wd2 in which job A2 is being executed.

Figure 15:
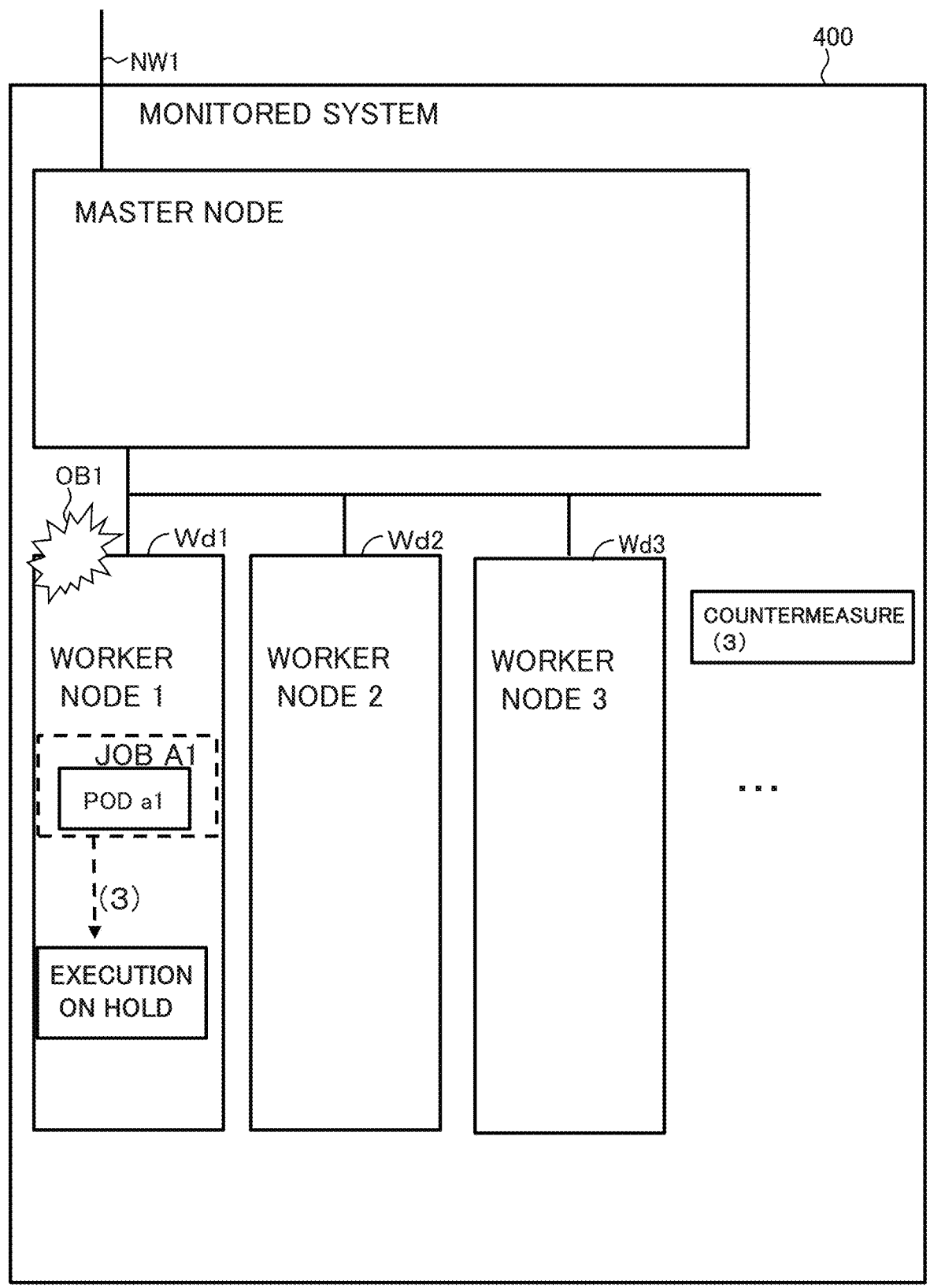
FIG. 15 illustrates an example of a countermeasure.

In the example shown in FIG. 15, in the monitored system 400, Pod a1 that is running Job A1 is deployed on the worker node 1 Wd1. In this case, it is assumed that the performance failure OB1 has occurred in the worker node 1 Wd1. As an example of a countermeasure to be created in this case, the countermeasure (3) is the countermeasure to hold the execution of Job A1.

Figure 16:
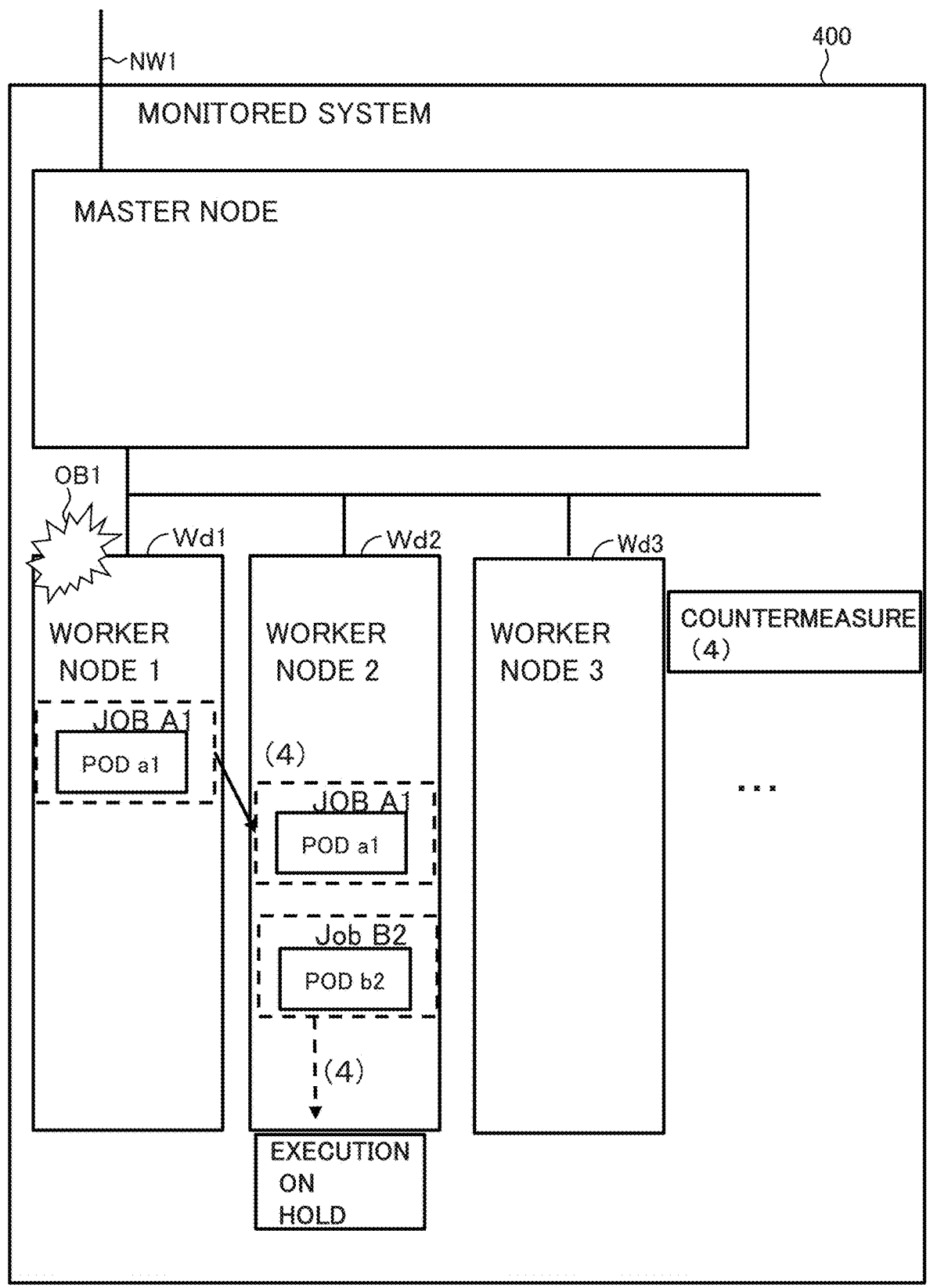
FIG. 16 illustrates an example of a countermeasure.

In the example shown in FIG. 16, in the monitored system 400, Pod a1 that is running Job A1 is deployed on the worker node 1 Wd1. Pod b2 that is running Job B2 is deployed on the worker node 2 Wd2. In this case, it is assumed that the performance failure OB1 has occurred in the worker node 1 Wd1. The priority of Job A1 is higher than that of Job B2. As an example of a countermeasure (4) to be created in this case, the countermeasure (4) is the countermeasure to move Pod a1 running Job A1 with a higher priority to the worker node 2 Wd2 and put the execution of the Job B2 with a lower priority on hold.

Figure 17:
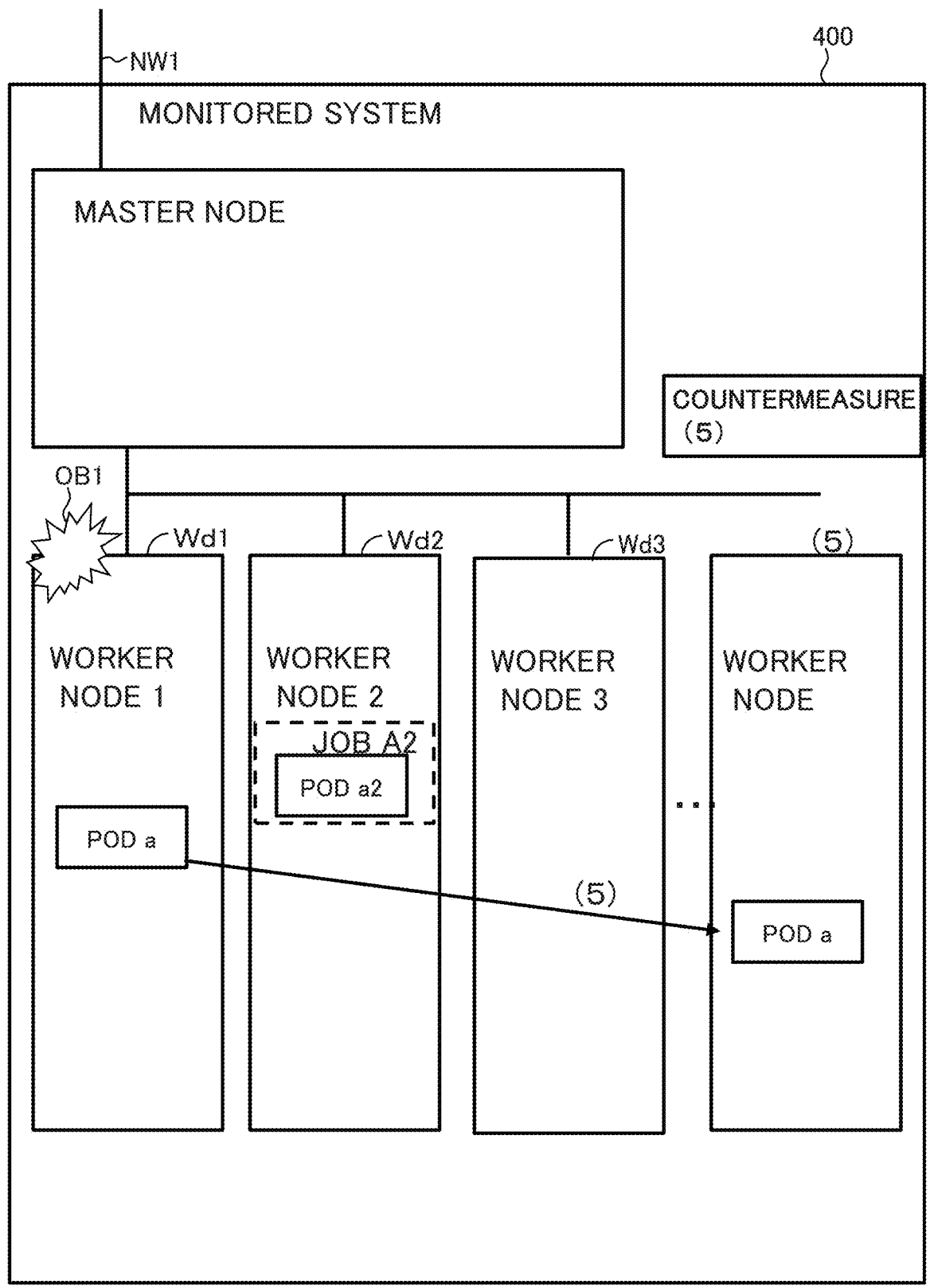
FIG. 17 illustrates an example of a countermeasure.

In the example shown in FIG. 17, in the monitored system 400, Pod a running the business application is deployed on the worker node 1 Wd1. Pod a2 running Job A2 is deployed on the worker node 2 Wd2. In this case, it is assumed that the performance failure OB1 occurs in the worker node 1 Wd1. As an example of a countermeasure (5) to be created in this case, the countermeasure (5) is the countermeasure to add a worker node and to move Pod a on the worker node 1 Wd1 to the added worker node.

FIG. 18 shows countermeasures 180 that include countermeasures (1) to (5). The system management device 100 creates countermeasures 180 to address the performance failure OB1. The countermeasures 180 are stored as a database in the storage device 110 of the system management device 110 shown in FIG. 2.

As shown in FIG. 18, the countermeasures 180 contain, as the columns that store information (values), a countermeasure 181, a single 182, a combination 183, a contents 184, a holding specific job 185, and an adding node 186. The countermeasures 180 store/contain information corresponding to each column related to the countermeasures as row-unit information in association with each other. Specifically, the countermeasure 181 contains the identification information of the countermeasure. The single 182 contains information that indicates whether or not the countermeasure is a single countermeasure. The combination 183 contains information that indicates whether or not the countermeasure is a combination of the countermeasures. The contents 184 contains information indicating the contents of the countermeasure. The holding specific job 185 contains information that indicates whether or not the countermeasure includes holding specific job. The adding node 186 contains information that indicates whether or not the countermeasure includes adding node.

As shown in FIG. 18, each of the countermeasures (1) to (3) is the single countermeasure, and each of the countermeasures (4) and (5) is the combination of countermeasures created by combing the single countermeasures. The countermeasures (1) and (2) do not include the holding specific job and the adding node. The countermeasures (3) and (4) include the holding specific job. The countermeasure (5) includes the adding node.

The countermeasure (2) includes moving Pod, increases the job processing load on the worker node Wd2, and may have a significant influence on the execution of Job A2, which has an execution deadline associated with the countermeasure (2), due to resource shortages. The countermeasure (3) includes putting Job A1 on hold, which may have a significant influence on the execution of Job A1 with an execution deadline. The countermeasure (4) includes the holding specific job and may have a significant influence on the execution of Job B2, which has an execution deadline. The countermeasure (5) includes the adding node, which may have a significant influence on the execution of Job A2 that has an execution deadline.

As described above, the execution of the countermeasure may have a significant influence on the execution of job(s) associated with the countermeasure. If the influence of the countermeasure on the execution of the job(s) associated with the countermeasure is significant, and if the monitored system 400 automatically executes the countermeasure, the job(s) may not be completed by the execution deadline. This may cause the job(s) to fail to complete by its due date/execution deadline. Therefore, the system management device 100 evaluates the influence of the countermeasure on the execution of the job(s) having he execution deadline related to the countermeasure if the monitored system 400 automatically executes the countermeasure. The system management device 100 executes the above evaluation before causing the monitored system 400 to automatically execute the countermeasure.

Then, the system management device 100 causes the monitored system 400 to automatically execute the countermeasure evaluated that the job(a) related to the countermeasure can be completed by the execution deadline. It should be noted that when there is a plurality of countermeasures evaluated that the job(s) related to the countermeasure can be completed by the execution deadline, the system management device 100 causes the monitored system 400 to automatically execute the selected countermeasure from out of those countermeasures. Specifically, the system management device 100 calculates the countermeasure score for each of the countermeasures using the score calculation information 112d of FIG. 9, and automatically causes the monitored system 400 to execute the countermeasure with the highest countermeasure score.

As explained above, the system management device 100 selects the countermeasure in consideration of the influence on the job for the countermeasures for the performance failure of the monitored system 400 and can cause the monitored system 400 to automatically execute the selected countermeasure. This allows the system management device 100 to reduce the possibility that the job with the execution deadline will not be completed by the deadline.

<Specific Operation>

Figure 19:
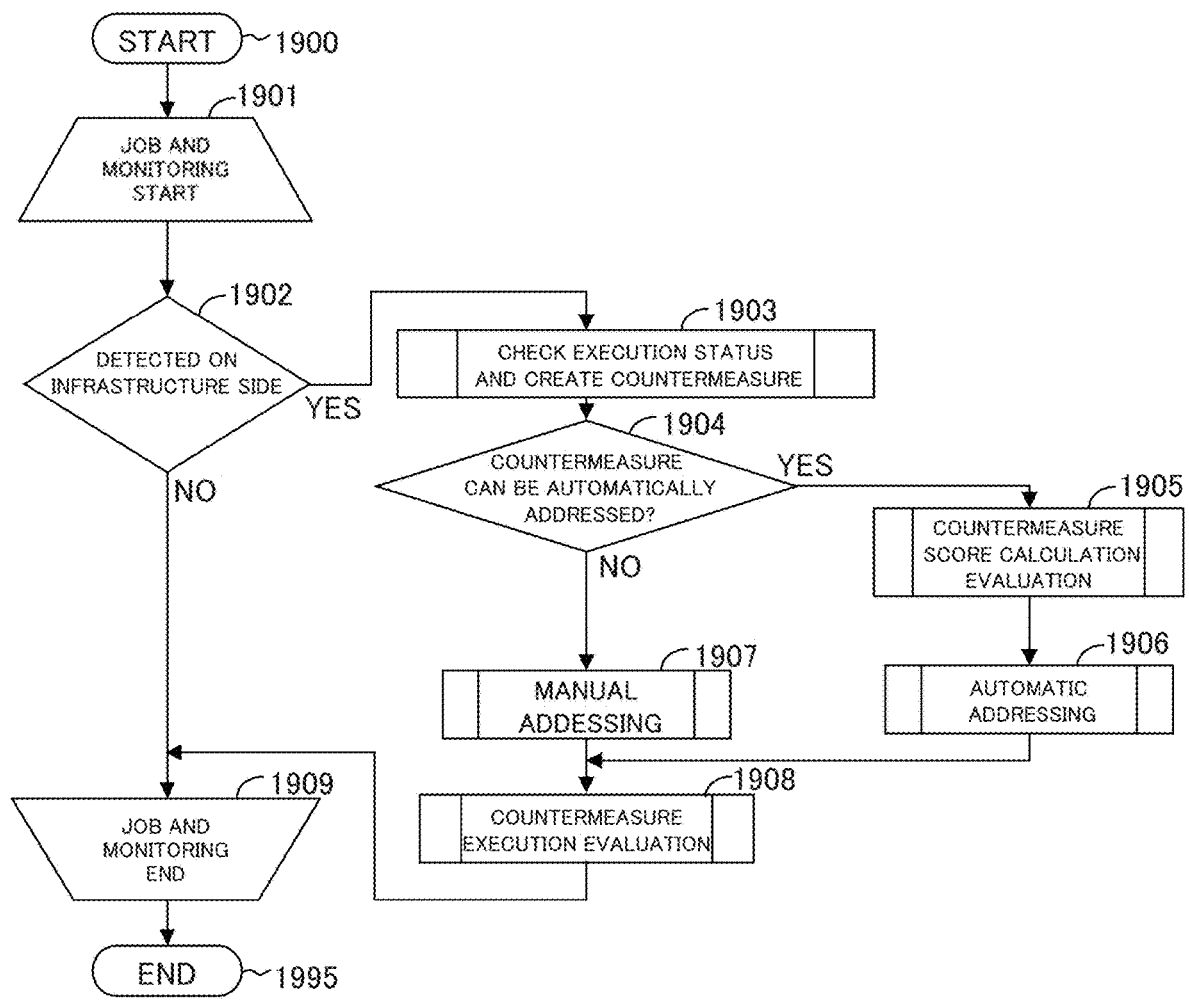
FIG. 19 is a flowchart showing a processing flow executed by the system management device.

FIG. 19 is a flowchart showing the processing flow executed by the system management device 100. The management device 100 executes the processing flow shown in FIG. 19. Therefore, the system management device 100 starts processing from step 1900 in FIG. 19. Thereafter, the system management device 100 executes appropriate processing out of steps 1902 to 1908 described later out of the processing of steps 1901 to 1909, repeatedly, until the job and infrastructure monitoring process (or jobs to be monitored) have been completed. Thereafter, the system management device 100 proceeds to step 1995 to terminate the present processing flow temporarily.

Specifically, the system management device 100 starts the job and infrastructure monitoring process at step 1901 and proceeds to step 1902. At step 1902, the system management device 100 receives the infrastructure information 312a from the infrastructure monitoring system 300 to determine whether or not an event indicating a performance failure has been detected on the infrastructure side (the monitored system 400) based on the received infrastructure information 312a.

When an event is detected on the infrastructure side that indicates a performance failure (e.g., job delay), the system management device 100 makes a "Yes" determination at step 1902 and proceeds to step 1903 to check the execution status and create one or more countermeasures. It should be noted that the details of the processing of step 1903 will be described later.

The system management device 100 then proceeds to step 1904. At step 1904, the system management device 100 determines, for each of the one or more countermeasures, whether or not the countermeasure can be automatically addressed by the monitored system 400. Details of the processing of step 1904 will be described later.

When at least one of one or more of the countermeasures can be automatically addressed by the monitored system 400, the system management device 100 makes a "YES" determination at step 1904, then executes steps 1905 and 1906 described below in sequence, and then proceeds to step 1908.

Step 1905: the system management device 100 evaluates the countermeasure(s) by calculating the countermeasure scores for those countermeasure(s) that are determined to be automatically addressable. The details of the processing of step 1905 will be described later.

Step 1906: the system management device 100 selects the countermeasure based on the results of the evaluation and causes the monitored system 400 to automatically execute the selected countermeasure.

On the other hand, when not all of the one or more countermeasures can be addressed automatically, the system management device 100 determines a "NO" determination at step 1904, executes step 1907 described below, and then proceeds to step 1908.

Step 1907: the system management device 100 suggests a manual action to the operator (user) of the monitored system 400. For example, the system management device 100 notifies a terminal of the operator (user) of the monitored system 400 that the manual action is urged to be executed.

Thereafter, the system management device 100 proceeds to step 1908 to evaluate the results of having executed the countermeasure. Specifically, the system management device 100 stores information (information corresponding to each column of the past handling record information 112a and the score data 112b, etc.) regarding the evaluation of the result of the executed countermeasure in the past handling record information 112a and the score data 112b.

Thereafter, the system management device 100 proceeds to step 1909.

Note that the above-mentioned step 1902 and step 1903 are executed by the countermeasure generation section 111a of the system management device 100 based on the infrastructure information 312a, etc., from the infrastructure monitoring system 300. The process of step 1904 is executed by the automatic coping judgment section 111d of the system management device 100 based on the job information 212a from the job monitoring system 200, the infrastructure information 312a from the infrastructure monitoring system 300, and the like. The process of step 1905 is executed by the countermeasure score calculation section 111b and the countermeasure score evaluation section 111 of the system management device 100 based on the job information 212a from the job monitoring system 200, the infrastructure information 312a from the infrastructure monitoring system 300, and the information in the database 112 of the system management device 100. The process of step 1906 is executed by the automatic execution section 111e of the system management device 100. The process of step 1907 is executed by the automatic coping judgment section 111d of the system management device 100. The process of step 1908 is executed by the countermeasure score evaluation section 111c.

<Step 1903>

Figure 20:
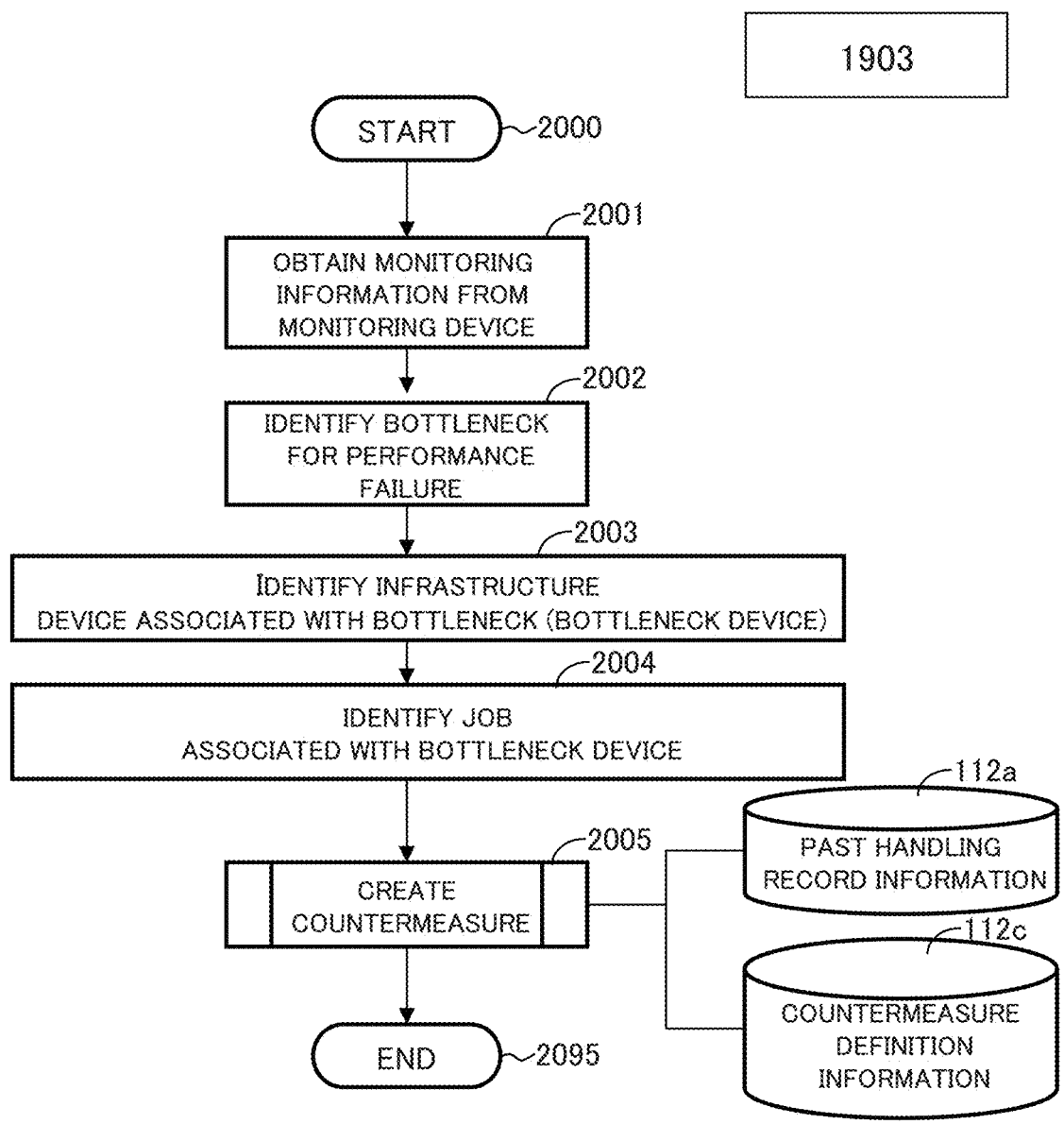
FIG. 20 is a flowchart showing a processing flow executed by the system management device.

The details of the process of step 1903 described above will be described. The countermeasure generation section 111a of the system management device 100 executes the processing flow shown in the flowchart in FIG. 20. Thus, the countermeasure generation section 111a starts processing from step 2000 in FIG. 20, executes steps 2001 to 2005 described below in order, and thereafter, proceeds to step 2095 to terminate the process flow tentatively.

Step 2001: the countermeasure generation section 111a obtains the job information 212a from the job monitoring system 200 and obtains the infrastructure information from the infrastructure monitoring system 300. Each of the job monitoring system 200 and the infrastructure monitoring system 300 is also referred to as a "monitoring device". That is, at step 2001, the countermeasure generation section 111a obtains the monitoring information (the job information 212a and the infrastructure information 312a) from the monitoring device.

Step 2002: the countermeasure generation section 111a identifies bottleneck(s) of the performance failure based on the infrastructure information 312a.

For example, in the example in FIG. 5, when the CPU usage of Pod b1 is the bottleneck in a case where the event that indicates a performance failure is "an event that Job A1 being executed by Podb1 is delayed", the countermeasure generation section 111a identifies the bottleneck as follows.

When Job A1 is being delayed, the countermeasure generation section 111a confirms that there is no problem with the CPU usage of Pod A1 related to Job A1 based on the pod information 312b of the infrastructure information 312a. The countermeasure generation section 111a confirms that the CPU usage of the worker node 1 Wd1 running Pod A1 is high. The countermeasure generation section 111a confirms that the CPU usage of Pod b1 being executed on the worker node 1 Wd1 is high and identifies that the CPU usage of Pod b1 is a bottleneck.

Step 2003: the countermeasure generation section 111a identifies the infrastructure device associated with the bottleneck based on the infrastructure information 312a. When the bottleneck is the CPU usage of Pod b1, the countermeasure generation section 111a identifies the worker node 1 Wd1 indicated by "1" of the node 312a1 associated with the node 1 pod information 312b as the infrastructure device (referred to as a "bottleneck device") associated with the bottleneck.

Step 2004: the countermeasure generation section 111a identifies the job(s) associated with the bottleneck device. For example, the countermeasure generation section 111a identifies job(s) associated with the identified bottleneck device (the worker node 1 Wd1) based on the node 1 pod information 312b of the identified bottleneck device.

Step 2005: the countermeasure generation section 111a creates one or more countermeasures (a single countermeasure(s) and/or a combination countermeasure(s)) based on the events detected at step 1901, the bottleneck(s) identified at steps 2002 to 2004, the bottleneck device(s) and job(s), the past handling record information 112a, and the countermeasure definition information 112c.

<Step 1904>

The details of the process of step 1904 described above will be described. The automatic coping judgment section 111d of the system management device 100 executes the processing flow shown in the flowchart in FIG. 21. Thus, the automatic coping judgment section 111d starts the process from step 2100 of FIG. 21 and executes one or more appropriate processes out of the step 2102 to step 2110 described below of the loop processes of steps 2101 to 2111, one by one for one or more countermeasures (hereinafter, it may also be referred to as "countermeasure suggestion(s)"). This loop process is repeatedly executed until the appropriate processes out of the processes of steps 2102 to 2110 are performed for all the countermeasures. Thereafter, the automatic coping judgment section 111d proceeds to step 2195 to terminate the processing flow tentatively.

Specifically, the automatic coping judgment section 111d proceeds to step 2102 to determine whether or not the countermeasure includes holding job.

When the countermeasure includes the holding job, the automatic coping judgment section 111d makes a "YES" determination at step 2102 and proceeds to step 2103 to evaluate the countermeasure against the holding job.

Specifically, the automatic coping judgment section 111d identifies a target job(s) with reference to the pod information 312b obtained from the infrastructure monitoring system 300. The target job(s) are job(s) to be held and one or more jobs (for example, a subsequent job of the job to be held, etc.) that affected by holding the job(s) to be held. It should be noted that the target job(s) can also be referred to as the "job related to the countermeasure (job hold)".

In addition, the automatic coping judgment section 111d obtains the priority for each of the one or more target jobs from the job information 212a obtained from the job monitoring system 200. The automatic coping judgment section 111d predicts the execution time of one or more target jobs when the countermeasure is executed based on the past handling record information 112a, etc., and calculates a predicted exceedance time to exceed the deadline of the target job after applying the countermeasure based on the predicted time and the execution deadline of the target job. The automatic coping judgment section 111d applies the job priority to the automatic handling upper limit information 112e in FIG. 10, to thereby obtain (set) the overdue upper limit for each of one or more target jobs. It should be noted that the overdue upper limit may also be referred to as the "overdue upper time limit" for convenience.

The automatic coping judgment section 111d determines whether or not the predicted exceedance time for exceeding the deadline of the target job after applying the countermeasure is equal to or less than the obtained overdue upper limit of the deadline for each of the one or more target jobs. When there is a target job in which the predicted exceedance time for exceeding the deadline of the target job after applying the countermeasure is longer than the obtained overdue upper limit of the deadline, the automatic coping judgment section 111d determines that the evaluation of the holding job of the countermeasure is "NG". When there is a target job in which the predicted exceedance time for exceeding the deadline of the target job after applying the countermeasure is equal to or less than the obtained overdue upper limit of the deadline, the automatic coping judgment section 111d determines that the evaluation of the holding job of the countermeasure is "OK". Thereafter, the automatic coping judgment section 111d proceeds to step 2104.

On the other hand, when the countermeasure does not include the holding job, the automatic coping judgment section 111d makes a "NO" determination at step 2102 and proceeds directly to step 2104.

At step 2104, the automatic coping judgment section 111d determines whether or not the countermeasure includes the addition of a node (the adding node).

When the countermeasure includes the addition of a node, the automatic coping judgment section 111d makes a "YES" determination at step 2104 and proceeds to step 2105 to evaluate the countermeasure for the addition of a node.

Specifically, the automatic coping judgment section 111d refers to the pod information 312b obtained from the infrastructure monitoring system 300 to identify one or more target node addition-related job(s) (e.g., job(s) affected by the adding node) that have the deadline for execution. It should be noted that the target node addition-related job(s) can also be referred to as "job(s) related to the countermeasure (the adding node)".

In addition, the automatic coping judgment section 111d applies the priority of the job to the automatic handling upper limit information 112e of FIG. 10 to thereby obtain (set) the overdue upper limit for each of the one or more target node addition-related job(s).

The automatic coping judgment section 111d determines, for each of the one or more target node addition-related job(s), whether or not predicted exceedance time for the job after the countermeasure is applied is equal to or less than the obtained overdue upper limit.

When there is the target node addition-related job(s) for which the predicted exceedance time for the job after the countermeasure is applied is longer than the obtained overdue upper limit, the automatic coping judgment section 111d judges/determines that the evaluation of the countermeasure for the node adding is "NG". When the predicted exceedance time to exceed the deadline for all the target node addition-related job(s) after applying the countermeasure is equal to or less than the obtained overdue upper limit, the automatic coping judgment section 111d determines that the evaluation of the countermeasure for the node adding is "OK". Thereafter, the automatic coping judgment section 111d proceeds to step 2106.

The automatic coping judgment section 111d proceeds to step 2106 to determine whether or not the countermeasure includes the moving Pod.

When the countermeasure includes the moving Pod, the automatic coping judgment section 111d makes a "YES" determination at step 2106 and proceeds to step 2107 to evaluate the countermeasure with respect to the moving Pod.

Specifically, the automatic coping judgment section 111d refers to the pod information 312b obtained from the infrastructure monitoring system 300 to identify one or more moving pod-related job(s) (e.g., jobs(s) executed by the Pod to be moved, job(s) to be executed by other Pod(s) deployed on the node to which the Pod has been moved) that have execution deadline associated with the moving Pod. In addition, the automatic coping judgment section 111d applies the priority of the job to the automatic handling upper limit information 112e in FIG. 10 to obtain (set) the overdue upper limit for each of the moving pod-related job(s).

The automatic coping judgment section 111d determines, for each of the one or more moving pod-related jobs, whether or not the predicted exceedance time for the moving pod-related job after the countermeasure is applied is equal to or less than the obtained overdue upper limit. When there is a moving pod-related job for which the predicted exceedance time for the moving pod-related job after the countermeasure is applied is longer than the obtained overdue upper limit, the automatic coping judgment section 111d determines that the countermeasure's evaluation for the moving Pod is "NG". When the predicted exceedance time for all the moving pod-related job(s) after the countermeasure is applied is equal to or less than the obtained overdue upper limit, the automatic coping judgment section 111d determines that the countermeasure's evaluation of the moving Pod is "OK". Thereafter, the automatic coping judgment section 111d proceeds directly to step 2108.

On the other hand, when the countermeasure does not include moving the Pod, the automatic coping judgment section 111d makes a "NO" determination at step 2106 and proceeds directly to step 2108.

At step 2108, the automatic coping judgment section 111d determines whether or not the countermeasure can be automatically addressed by the monitored system 400. In other words, the automatic coping judgment section 111d evaluates whether or not the job(s) associated with the countermeasure can be completed by the execution deadline.

Specifically, the automatic coping judgment section 111d evaluates (determines) as follows.

When the countermeasure does not include any the holding job, the adding node, or the moving Pod, all of the job(s) associated with the countermeasure can be evaluated as being able to be completed by the execution deadline, and the automatic coping judgment section 111d determines that the countermeasure is capable of automatic coping.

When the countermeasure includes at least one of the evaluations for the holding job, the adding node, and the moving Pod, and at least one of the job hold evaluation, adding node evaluation and moving Pod evaluation is "NG", since the job related to the countermeasure includes the job that cannot be evaluated as being able to be completed by the execution deadline, the automatic coping judgment section 111d determines that the countermeasure cannot be automatically addressed.

When the countermeasure includes at least one of the holding job, the adding node, and the moving Pod, and the evaluations for at least one of the holding target job, the adding node, and the moving Pod included in the countermeasure are all "OK", all of the job(s) associated with the countermeasure are evaluated as possible to complete by the due date/execution deadline. Therefore, the automatic coping judgment section 111d determines that the countermeasure can be automatically addressed.

When the automatic coping judgment section 111d determines that the countermeasure can be automatically addressed, it makes a "YES" determination at step 2108 and proceeds to step 2109 to set an automatic coping possibility flag to "True" for the countermeasure. Thereafter, the automatic coping judgment section 111d proceeds to step 2111.

On the other hand, when the automatic coping judgment section 111d determines that the countermeasure cannot be automatically addressed, it makes a "NO" determination at step 2108 and proceeds to step 2110 to set the automatic coping possibility flag to "FALSE" for the countermeasure. Thereafter, the automatic coping judgment section 111d proceeds to step 2111.

<Step 1905>

The details of step 1905 above will be described in detail. The countermeasure score calculation section 111b and the countermeasure score evaluation section 111c of the system management device 100 execute the processing flow shown in the flowchart in FIG. 22. Note that steps 2201 to 2206 and step 2208 are executed by the countermeasure score calculation section 111b. Steps 2207 and 2209 are executed by the countermeasure score evaluation section 111c.

Figure 22:
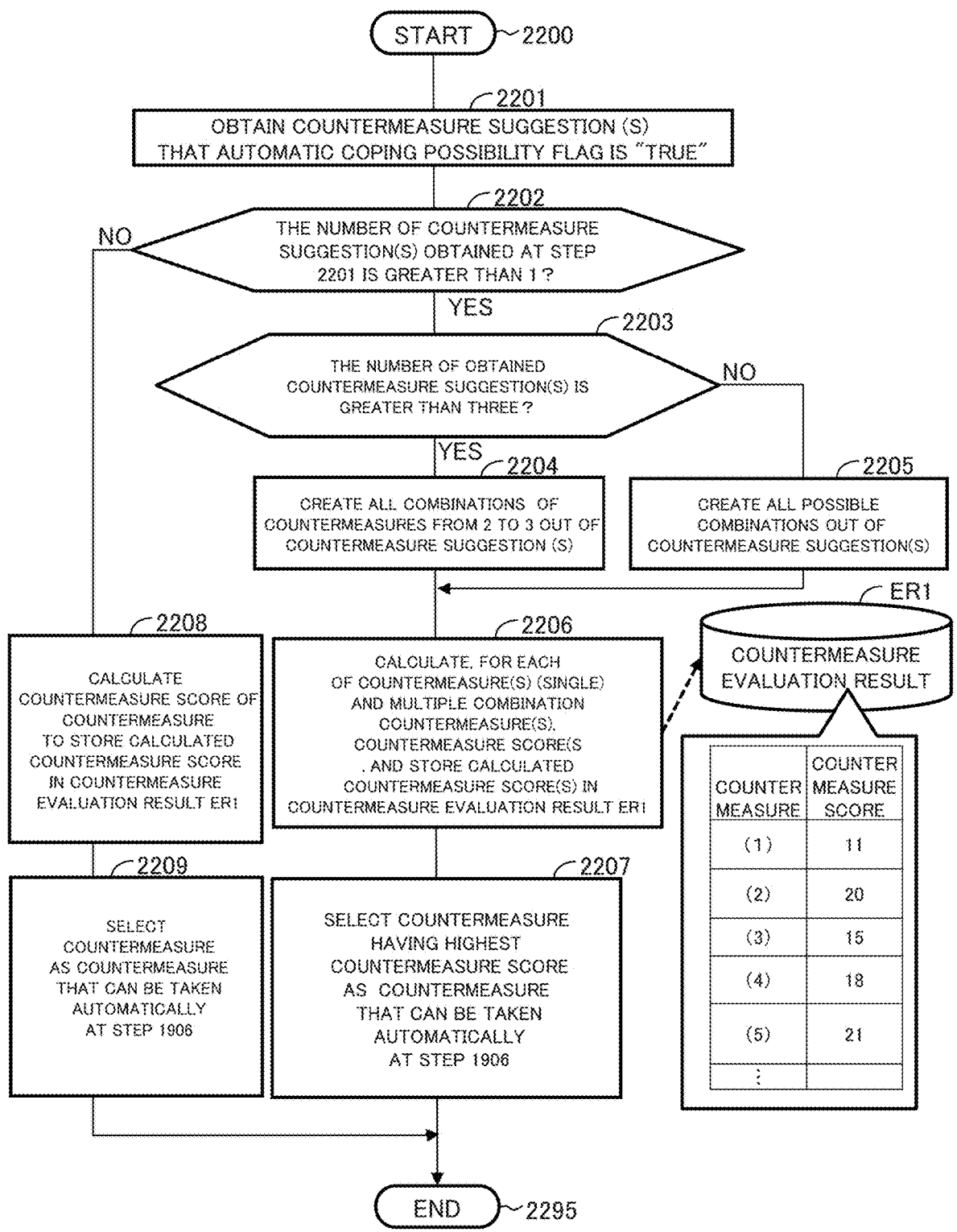
FIG. 22 is a flowchart showing a processing flow executed by the system management device.

The countermeasure score calculation section 111b starts processing from step 2200 in FIG. 22 and proceeds to step 2201 to obtain the countermeasure suggestion(s) that the automatic coping possibility flag is "True" to proceed to step 2202.

The countermeasure score calculation section 111b proceeds to step 2202 to determine whether or not the number of the countermeasure suggestion(s) obtained at step 2201 is greater than 1.

When the number of the countermeasure suggestion(s) is greater than 1, the countermeasure score calculation section 111b makes a "YES" determination at step 2202 and proceeds to step 2203 to determine whether or not the number of the countermeasure suggestion(s) is greater than the preset upper limit number of combinations (3 in this example).

When the number of the countermeasure suggestion(s) is greater than the preset upper limit number of combinations (3 in this example), the countermeasure score calculation section 111b makes a "YES" determination at step 2203 and proceeds to step 2204. At step 2204, the countermeasures score calculation section 111b generates/creates all combinations, out of the countermeasure suggestion(s), from 2 to the preset upper limit number of combinations (3 in this example). This combination of the countermeasure suggestion(s) is also referred to as a "multiple combination countermeasure". It should be noted that a countermeasure suggestion that is not the combination of countermeasure suggestion(s) is also referred to as a "countermeasure (single)". Thereafter, the countermeasure score calculation section 111b proceeds to step 2206.

On the other hand, when the number of countermeasure suggestion(s) is equal to or less than the preset upper limit number of combinations (3 in this example), the countermeasure score calculation section 111b makes a "NO" determination at step 2203 and proceeds to step 2205. At step 2205, the countermeasure score calculation section 111b creates all possible combinations of countermeasure suggestion(s) (i.e., for example, "multiple combination countermeasure(s)"). That is, for example, if the number of countermeasure suggestion(s) is three, the countermeasure score calculation section 111b generates/creates a combination of two countermeasure out of the countermeasure suggestion(s) and a combination of three countermeasures out of the countermeasure suggestion(s), the combination of two countermeasures being the multiple countermeasure combination, the combination of three countermeasures being the multiple countermeasure combination. For example, if the number of the countermeasure suggestion(s) is two, a combination of two countermeasures out of the countermeasure suggestion(s) is generated/created, the combination of two countermeasures being the multiple combination countermeasure. Thereafter, the countermeasure score calculation section 111b proceeds to step 2206.

At step 2206, the countermeasure score calculation section 111b calculates, for each of the countermeasure(s) (single) and the multiple combination countermeasure(s), the countermeasure score obtained based on a specific evaluation viewpoint and stores the calculated countermeasure score in the countermeasure evaluation result ER1, based on the score calculation information 112d, the past handling record information 112a, and the like. Although not shown in FIG. 2, the countermeasure evaluation result ER1 is included in the storage device 110 in FIG. 2. Specifically, the countermeasure score calculation section 111b applies the target resource usage reduction rate of when the countermeasure is executed to the score calculation information 112d of "the effect on countermeasure 112f", to thereby obtain one of the scores 1-3. Furthermore, the countermeasure score calculation section 111b applies the reduction in job execution time of when the countermeasure is executed to "the effect on countermeasure 112f", to thereby obtain one of the scores 1-3. Then, the countermeasure score calculation section 111b obtains the sum of the obtained scores as "the score of the effect on countermeasure (=Score1)". This Score1 is a score obtained based on the viewpoint of the effect on countermeasure, which is one of the specific viewpoints.

In addition, the countermeasure score calculation section 111b applies the percentage increase in the cloud resource billing amount if the countermeasure is executed to the cost 112g to thereby obtain one of the scores 1-3. In addition, the countermeasure score calculation section 111b applies the amount of increase in the cloud resource billing amount if the countermeasure is executed to the cost 112g to thereby obtain one of the scores 1-3. Then, the countermeasure score calculation section 111b calculates the sum of the obtained scores as "the score of the cost (=Score2)". This Score2 is the score obtained based on the viewpoint of the cost, which is one of the specific viewpoints.

The countermeasure score calculation section 111b applies the number of Pods that would be affected through the execution of the countermeasure to the range of influence 112h to obtain one of the scores 1-3. Furthermore, the countermeasure score calculation section 111b applies the total of job priorities that would be affected through the execution of the countermeasure to the range of influence 112h to thereby obtain one of the scores. Then, the countermeasure score calculation section 111b calculates the sum of the scores obtained as "the score of the range of influence (=Score3)". This Score3 is the score obtained based on the viewpoint of the scope of influence on the infrastructure, the job, and the like, which is one of the specific viewpoints.

The countermeasure score calculation section 111b applies the scheduled exceedance time (predicted exceedance time) of each target job if the countermeasure is executed to the deadline/execution time 112i, to thereby obtain one of the scores 1-3. Then, the countermeasure score calculation section 111b calculates the sum of the scores obtained as "the deadline/execution time score (=Score4)". This Score4 is the score obtained based the viewpoint of the deadline/execution time, which is one of the specific viewpoints.

The countermeasure score calculation section 111b applies the priority of the holding job if the countermeasure is executed to the job hold 112j, to thereby obtain one of the scores 1-3. In addition, the countermeasure score calculation section 111b applies the priority of the subsequent job if the countermeasure is executed to the job hold 112j, to thereby obtain one of the scores 1-3. It should be noted that if there is a plurality of multiple target jobs, the highest priority is applied to the job hold 112j. Then, the countermeasure score calculation section 111b calculates the sum of the scores obtained as "the score of the job hold (=Score5)". This Score5 is the score obtained based on the viewpoint of the job hold (priority), which is one of the specific viewpoints.

The countermeasure score calculation section 111b calculates the countermeasure score using the following Formula 1.

countermeasure score=($W1 \times Score1$)+($W2 \times Score2$)+ ($W3 \times Score3$)+$W4$($W4 \times Score4$)+($W5 \times Score5$)     Formula 1:

In Formula 1, each of W1 to W5 is a weight. A value is set to each of W1 to W5 based on the past handling record information 112a. The weight may be fixed value.

Then, the countermeasure score calculation section 111b proceeds to step 2207. At step 2207, the countermeasure score evaluation section 111c selects the countermeasure (the countermeasure (single) or the multiple countermeasure combination) with the highest countermeasure score out of the countermeasure(s) (single) and the multiple countermeasure combination(s) as the countermeasure that can be taken automatically. The countermeasure score evaluation section 111c selects the countermeasure in above-described manner to thereby be able to select the most appropriate countermeasure in the entire monitored system 400 as the countermeasure that can be automatically taken. Thereafter, the countermeasure score evaluation section 111c proceeds to step 2295 to terminate this process flow tentatively.

At step 2202, when the number of the countermeasure suggestion(s) is equal to or less than one (i.e., the number of the countermeasure suggestion(s) is only one), the countermeasure score calculation section 111b makes a "NO" determination at step 2202 to proceed to step 2208. At step 2208, the countermeasure score calculation section 111b calculates the countermeasure score of the countermeasure (single) of the countermeasure suggestion(s) to store the calculated countermeasure score in the countermeasure evaluation result ER1. Thereafter, the countermeasure score calculation section 111b proceeds to step 2209.

At step 2209, the countermeasure score evaluation section 111c selects the countermeasure (single) out of the countermeasure suggestion(s) as the possible automatic countermeasure(s). Thereafter, the countermeasure score evaluation section 111c proceeds to step 2295 to terminate this process flow tentatively.

<Effect>

As described above, the system management device 100 according to the embodiment of the present invention is able to select an appropriate countermeasure to a performance failure by considering the influence on the job and have the selected countermeasure automatically executed by the monitored system 400.

Modified Example 1

Figure 23:
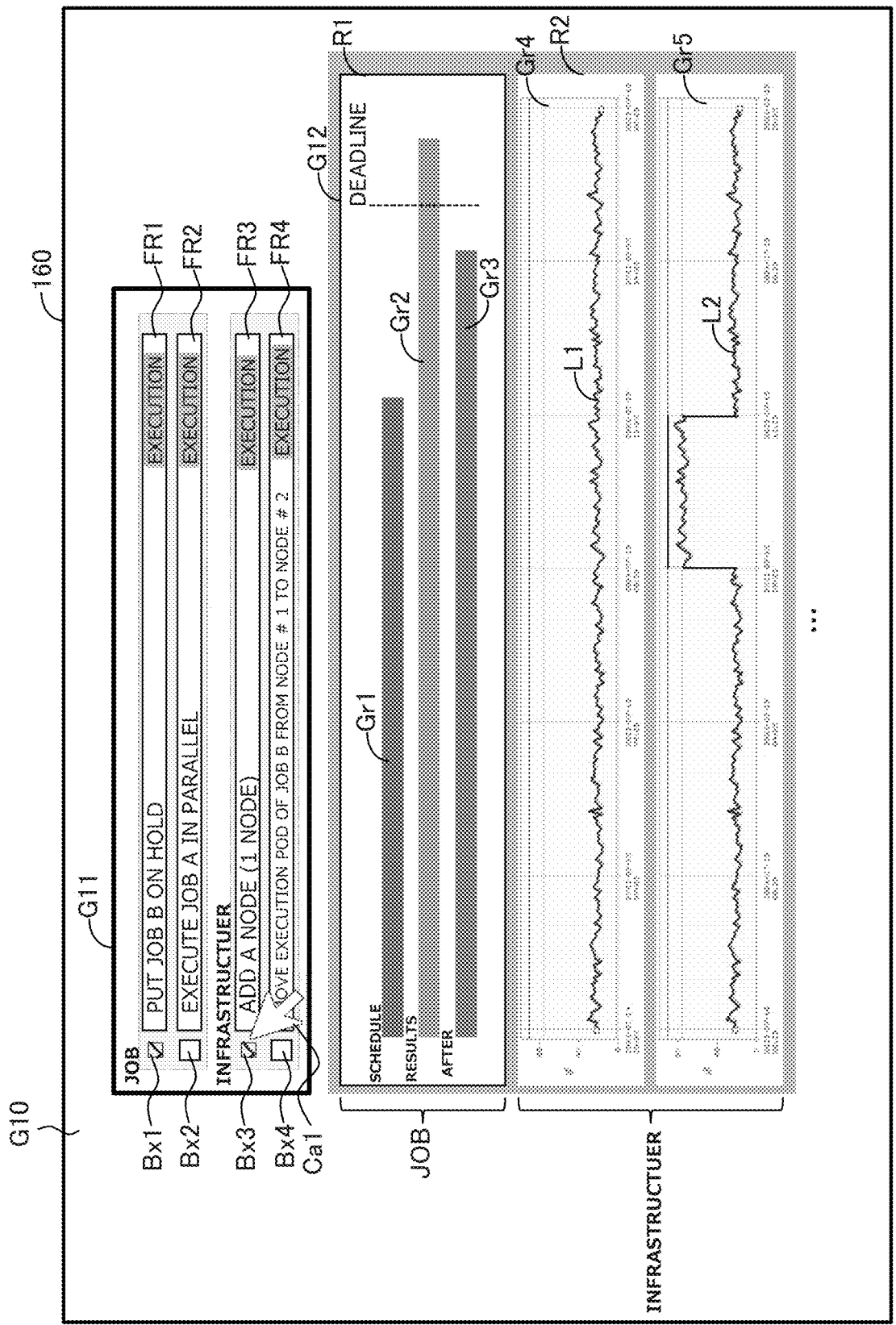
FIG. 23 shows an example of an evaluation screen for a counter measure displayed on a display.

The system management device 100 described above may display a countermeasure evaluation screen G10 on the display 160 representing the evaluation of the countermeasure before allowing the monitored system 400 to automatically execute the countermeasure. FIG. 23 shows an example of the countermeasure evaluation screen. As shown in FIG. 23, the countermeasure evaluation screen G10 includes a countermeasure display image G11 and an evaluation display image G12.

The countermeasure display image G11 includes frames FR1 to FR4 and checkboxes Bx1 to Bx 4. It should be noted that frames FR1 to FR4 are referred to as "frames FR" when there is no need to distinguish between them. Checkboxes Bx1 to Bx4 are referred to as "checkboxes Bx" when there is no need to distinguish between them. The frames FR1 and FR2 contain the contents of the countermeasure regarding the job. The frames FR3 and FR4 contain the contents of the countermeasure regarding the infrastructure.

A cursor Ca1 is operated by the user operating a mouse or other operating device. When a checkbox Bx is in the state where no checkmark is displayed on it (the checkbox Bx is "OFF"), the cursor Ca1 is overlaid on the checkbox Bx (the checkbox Bx is "OFF"), and a specific operation is performed on the operation device, a countermeasure of a frame FR corresponding to that the checkbox Bx is selected and the checkmark is displayed on the checkbox BX (the check box Bx becomes in the "ON" state). When the checkmark is displayed on the check box Bx (the check box Bx is in the "ON" state), the cursor Ca1 is overlaid on checkbox Bx, and a specific operation is performed on the operating device, the checkbox Bx is deselected and the checkpoint on checkbox Bx is no longer displayed (checkbox Bx becomes "OFF").

The evaluation display image G12 includes a first area R1 that displays the evaluation of the job of the countermeasure and a second area R2 that displays the evaluation of the infrastructure of the countermeasure.

Barometer Gr1 indicates the length of the job's past scheduled execution time. Barometer Gr2 indicates the length of the scheduled execution time of the job before applying the countermeasure (before the countermeasure is executed) at the present time. Barometer Gr3 indicates the length of the job's scheduled execution time when the countermeasure selected by turning the check box ON is applied (executed) at the present time. In the example in FIG. 23, it can be seen from the image that before the countermeasure is applied, the scheduled job execution time has exceeded the execution deadline, whereas after the countermeasure is applied, the scheduled job execution time has not exceeded the execution deadline.

The second area R2 includes a graph area Gr4 and a graph area Gr5 to display metric performance information. The graphs displayed in each of the graph area Gr4 and the graph area Gr5 indicate performance prediction information for each metric after application if the countermeasure corresponding to the check box Bx in the "ON" state is executed. This allows the user to confirm the performance prediction information for each metric according to the selection of the countermeasure by means of images.

Modified Example 2

Figure 24:
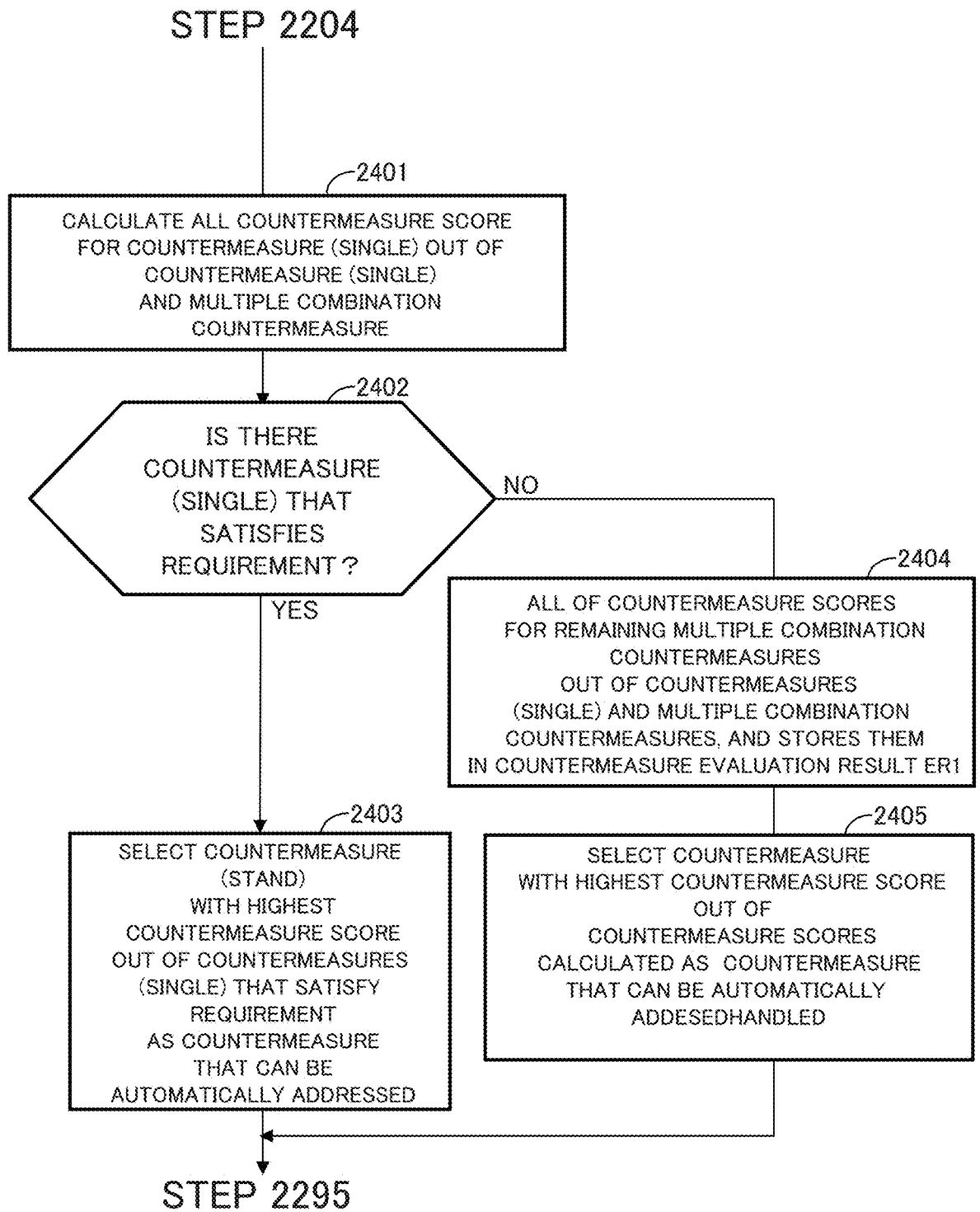
FIG. 24 is a flowchart showing a processing flow executed by the system management device.

The system management device 100 may execute a flowchart in which steps 2206 to 2207 shown in FIG. 22 are replaced by steps 2401 to 2406 that will be describe below shown in FIG. 24.

At step 2401, the countermeasure score calculation section 111b calculates all the countermeasure score(s) for the countermeasure(s) (single) out of countermeasure(s) (single) and the multiple combination countermeasure(s) to store them in the countermeasure evaluation result ER1. Thereafter, the countermeasure score calculation section 111b proceeds to step 2402 to determine whether or not there are countermeasure(s) (single) that satisfies the requirement out of the countermeasure(s) (single) for which the countermeasure score(s) were calculated. The requirement is "the countermeasure score is greater than or equal to a predetermined threshold score".

When there are countermeasure(s) (single) that meet the requirement, the countermeasure score calculation section 111b makes a "YES" determination at step 2402 to execute the process of step 2403 described below and thereafter, proceeds to step 2295 to terminate this process flow tentatively.

Step 2403: the countermeasure score calculation section 111b selects the countermeasure (single) with the highest countermeasure score out of the countermeasure(s) (single) that satisfy the requirement as the countermeasures that can be automatically addressed.

On the other hand, when there are no countermeasure(s) (single) that satisfy the requirement, the countermeasure score calculation section 111b makes a "NO" determination at step 2402 to execute step 2404 and step 2405 described below in order, and thereafter, proceeds to step 2295 to terminate this process flow tentatively.

Step 2404: the countermeasure score calculation section 111b calculates all of the countermeasure scores for the remaining multiple countermeasure combination(s) out of the countermeasure(s) (single) and the multiple countermeasure combination(s), and stores them in the countermeasure evaluation result ER1.

Step 2405: the countermeasure score calculation section 111b selects the countermeasure with the highest countermeasure score out of the countermeasure score(s) of the multiple countermeasure countermeasure(s) that have been calculated, as the countermeasure that can be addressed automatically.

According to this modified example 2, out of the countermeasure(s) (single) and the multiple countermeasure combination(s), the countermeasure score(s) are first calculated from the countermeasure(s) (single). If the countermeasure (single) satisfies the requirement, the countermeasure (single) is selected as the countermeasure that can be automatically executed. Therefore, this modified example 2 allows the monitored system 400 to select the countermeasure that can be automatically executed more promptly.

Modified Example 3

The countermeasure (5) in FIG. 17 includes the addition of a node/adding node. If the countermeasure (5) is automatically executed by the monitored system 400, it could result in additional fees (additional costs) that are unacceptable to the users of the monitored system 400.

In contrast, the system management device 100 may execute the following process. That is, if the countermeasure includes the adding node, the system management device 100 further determines whether or not the additional cost incurred by executing the countermeasure is equal to or less than a predetermined upper cost limit. If the system management device 100 determines that the additional cost is equal to or less than the predetermined upper cost limit, the system management device 100 selects the countermeasure to be executed by the monitored system 400 out of the countermeasures that the jobs associated with the countermeasures are evaluated as being able to be completed by the execution deadline.

Figure 21:
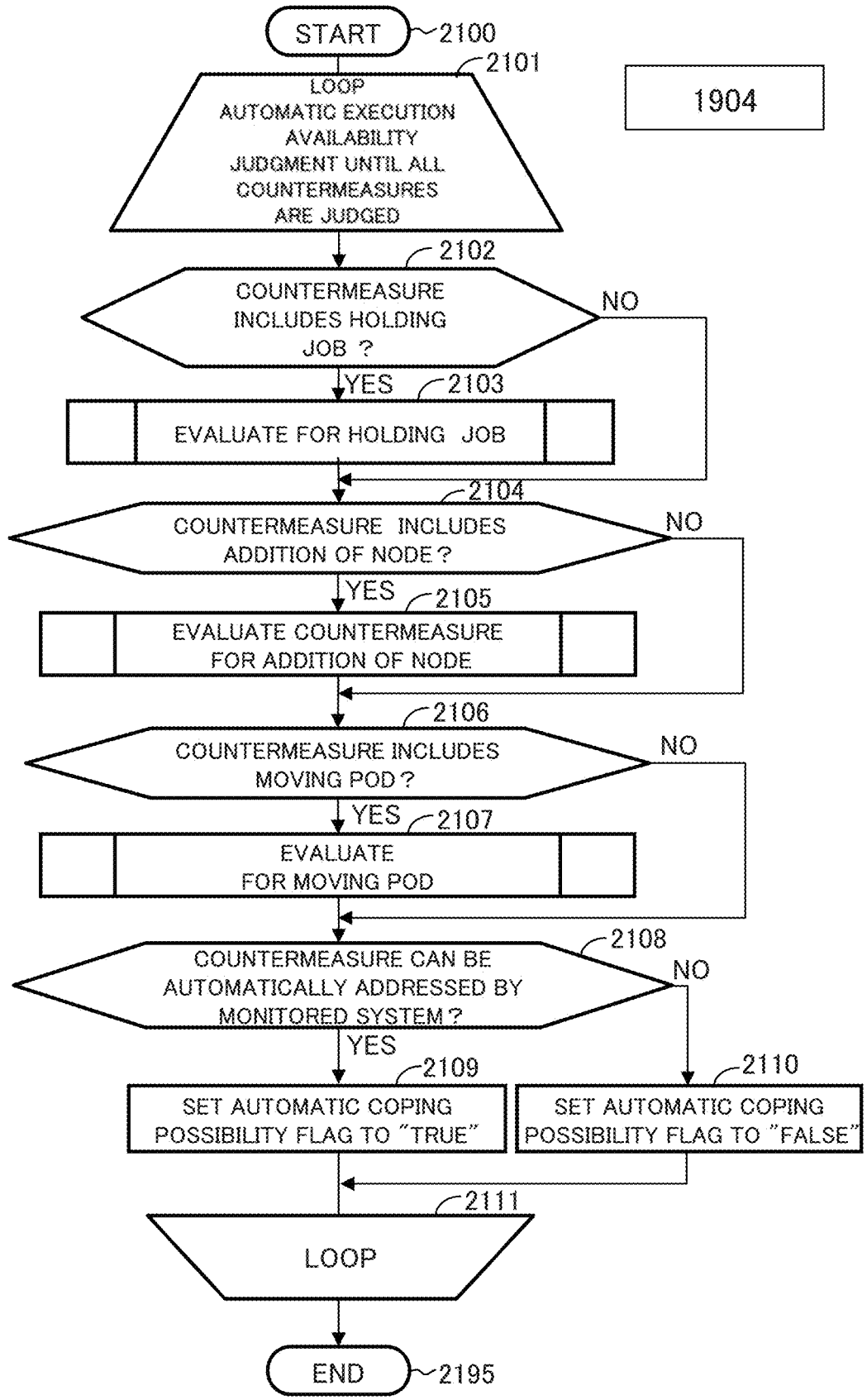
FIG. 21 is a flowchart showing a processing flow executed by the system management device.

In this case, the automatic coping judgment section 111d of the system management device 100 evaluates the adding node to be targeted on the countermeasure at step 2105 of FIG. 21, in such a manner described below.

Specifically, at step 2105, the automatic coping judgment section 111d identifies one or more target node addition-related jobs with a due date/execution deadline associated with the adding node by referring to the pod information 312b obtained from the infrastructure monitoring system 300. In addition, the automatic coping judgment section 111d also obtains (sets) the overdue upper limit and the additional cost limit for each of the one or more target node addition-related jobs by applying the job priority to the automatic handling upper limit information 112e in FIG. 10.

It should be noted that the additional cost limit may also be referred to as the "maximum additional cost" for convenience.

The automatic coping judgment section 111d determines, for each of one or more target node addition-related jobs, whether or not the predicted exceedance time for the target node addition-related job after the countermeasure is applied is equal to or less than the obtained overdue upper limit, and the cost (additional cost) incurred by the adding node of the countermeasure is equal to or less than the additional cost limit.

If there is a target node addition-related job that satisfies at least one of the following two conditions: the predicted exceedance time is longer than the obtained overdue upper limit, and the cost (additional cost) incurred by the adding node of the countermeasure is higher than the additional cost limit, the automatic coping judgment section 111d judges/determines the evaluation for the adding node of the countermeasure to be "NG".

If the predicted exceedance time for all of the target node addition-related jobs is equal to or less than the obtained overdue upper limit, and the additional cost incurred by the adding node of the countermeasure is equal to or less than the additional cost limit, then the automatic coping judgment section 111d judges/determines the evaluation for the adding node of the countermeasure to be "OK". Thereafter, the automatic coping judgment section 111d proceeds to step 2106.

On the other hand, when the countermeasure does not include the adding node, the automatic coping judgment section 111d makes a "NO" determination at step 2104 and proceeds directly to step 2106.

According to this modified example 3, the modified example 3 can reduce the possibility of user-unacceptable additional fees (additional costs) by having the monitored system 400 automatically execute the countermeasure.

Other Modified Examples

The present invention is not limited to the above embodiments and the modified examples (the modified example 1, the modified example 2, and the modified example 3), and various modified examples/variations may be employed within the scope of the invention. The modified examples of the invention can be combined with each other within the scope of the present invention.

For example, in the above embodiments and the modified examples, a combination of countermeasures may be created at step 2005, but only a single countermeasure may be created at step 2005.

For example, in the embodiments and the modified examples described above, the system management device 100 may omit evaluating the adding node when determining whether it can be automatically addressed. That is, the system management device 100 may execute a flowchart omitted steps 2104 and step 2105 in FIG. 21.

For example, in the embodiments and the modified examples described above, when determining whether or not the system management device 100 is capable of automatic coping, it may omit evaluation for moving Pod. It may omit evaluation for the adding node. That is, the system management device 100 may execute the flowchart omitted steps 2106 and 2107 in FIG. 21.

For example, in the embodiment described above, the system management device 100 may select one or more possible automatic countermeasure in such a manner described below. The system management device 100 calculates a countermeasure score for each of the one or more countermeasures created at step 1903 and selects candidate countermeasure (s) from out of the one or more countermeasures based on the calculated countermeasure score. For example, the system management device 100 selects as, the candidate countermeasure, the countermeasure for which the calculated countermeasure score is greater than a predetermined threshold score. Furthermore, the system management device 100 determines whether or not the selected candidate countermeasure can be automatically addressed. The system management device 100 then selects the candidate countermeasure that is determined to be capable of being automatically addressed as the countermeasure that is capable of being automatically addressed.

What is claimed is:

1. A system management device including an information processing device that manages a monitored system built in a cloud environment,
wherein
the information processing device is configured to:
create, when a performance failure occurs in the monitored system, a plurality of countermeasures for the performance failure;
evaluate, for each of the plurality of countermeasures that has been created, influence of the countermeasure on execution of a job having an execution deadline associated with the countermeasure; and
select the countermeasure to be executed by the monitored system from out of the plurality of countermeasures that are evaluated to be capable of completing the job associated with the countermeasure by the execution deadline.

2. The system management device according to claim 1, wherein,
the monitored system includes a master node and a plurality of worker nodes that provide an execution environment for container and on which Pod including the container is deployed,
the monitored system is a computer system managed by a tool that orchestrates.

3. The system management device according to claim 1, wherein,
the information processing device is configured to:
obtain infrastructure information about the monitored system; and
identify the job having the execution deadline associated with the countermeasure, based on the infrastructure information.

4. The system management device according to claim 1, wherein,
the information processing device is configured to:
calculate predicted exceedance time over the execution deadline for the job associated with the countermeasure;
evaluate the influence of the countermeasure by determining whether or not the predicted exceedance time is equal to or less than a predetermined overdue upper limit time; and
evaluate that the job associated with the countermeasure can be completed by the execution deadline, for the countermeasure determined that the predicted exceedance time is equal to or less than the predetermined overdue upper limit time.

5. The system management device according to claim 4, wherein,
the information processing device is configured to set the predetermined overdue upper limit time based on priority of the job associated with the countermeasure.

6. The system management device according to claim 1, wherein,
the information processing device is configured to:
determine whether or not an additional cost incurred if the countermeasure is executed is equal to or less than a predetermined upper cost limit; and select the countermeasure to be executed by the monitored system from out of the countermeasures for which the additional cost is determined to be equal to or less than the predetermined upper cost limit and for which the job associated with the countermeasure is evaluated to be complete by the execution deadline.

7. The system management device according to claim 6, wherein,
the information processing device is configured to set the predetermined upper cost limit based on priority of the job associated with the countermeasure.

8. The system management device according to claim 1, wherein,
the information processing device is configured to:
evaluate each of the plurality of countermeasures for which a job associated with the countermeasure is evaluated to be complete by the execution deadline based on a specific evaluation perspective; and
select the highest evaluated countermeasure out of from the plurality of countermeasures as the countermeasure to be executed by the monitored system.

9. The system management device according to claim 8, wherein,
the information processing device is configured to:
execute the evaluation based on the specific evaluation perspectives on some of the plurality of countermeasures, and
select, when the evaluation results of some of the countermeasures are determined to satisfy a predetermined requirement in the evaluation, as the countermeasure to be executed by the monitored system.

10. The system management device according to claim 8, wherein,
the information processing device is configured to use, as the specific evaluation perspectives, effect of the countermeasure; cost of the countermeasure; range of influence of the countermeasure; the execution deadline and execution time of the countermeasure; and holding job.

11. The system management device according to claim 1, the system management device including a display device that is connected to the information device,
wherein,
the information processing device is configured to display an image on the display device, the image indicating whether or not the job associated with the countermeasure will exceed the execution deadline for the job if the countermeasure is executed.

12. A system management method, the system management method being executed by a system management device that manages a monitored system built in a cloud environment,
the system management method including:
creating, when a performance failure occurs in the monitored system, a plurality of countermeasures for the performance failure;
evaluating, for each of the plurality of countermeasures that has been created, influence of the countermeasure on execution of a job having an execution deadline associated with the countermeasure; and
selecting the countermeasure to be executed by the monitored system from out of the plurality of countermeasures that are evaluated to be capable of completing the job associated with the countermeasure by the execution deadline.

* * * * *